United States Patent [19]
Hoshi et al.

[11] Patent Number: 4,903,124
[45] Date of Patent: Feb. 20, 1990

[54] IMAGE INFORMATION SIGNAL TRANSMISSION APPARATUS

[75] Inventors: Nobuhiro Hoshi, Atsugi; Hisashi Ishikawa, Sagamihara; Yoshiki Ishii, Hadano; Toshihiro Yagisawa; Akio Fujii, both of Yokohama, all of Japan

[73] Assignee: Canon Kabushiki Kaisha, Tokyo, Japan

[21] Appl. No.: 673,244

[22] Filed: Mar. 16, 1989

[30] Foreign Application Priority Data

| Mar. 17, 1988 | [JP] | Japan | 63-064131 |
| Jul. 29, 1988 | [JP] | Japan | 63-189808 |
| Aug. 5, 1988 | [JP] | Japan | 63-194352 |
| Aug. 5, 1988 | [JP] | Japan | 63-194353 |
| Aug. 5, 1988 | [JP] | Japan | 63-194354 |
| Aug. 5, 1988 | [JP] | Japan | 63-194355 |
| Aug. 5, 1988 | [JP] | Japan | 63-194356 |
| Sep. 29, 1988 | [JP] | Japan | 63-242216 |

[51] Int. Cl.$^4$ .............................................. H04N 7/13
[52] U.S. Cl. .................................... 358/133; 358/138
[58] Field of Search ................ 358/133, 135, 136, 138

[56] References Cited

U.S. PATENT DOCUMENTS 4,558,350 12/1985 Murakami ........................... 358/133
4,805,017 2/1989 Kaneko ................................ 358/135

FOREIGN PATENT DOCUMENTS 0156602 10/1985 European Pat. Off. .
0185533 6/1986 European Pat. Off. .
0186444 7/1986 European Pat. Off. .

OTHER PUBLICATIONS

IEE Proceedings, vol. 133, Pt. F, No. 5, Aug. 1986, pp. 428–487, Goldberg et al., "Image Sequence Coding by Three–Dimensional Block Vector Quantisation".

Primary Examiner—Howard W. Britton
Attorney, Agent, or Firm—Fitzpatrick, Cella, Harper & Scinto

[57] ABSTRACT

Disclosed is an image information signal transmission apparatus wherein an image information signal in which one frame is constituted by a plurality of sample data is input, the input image information signal is divided into a plurality of blocks each consisting of a predetermined number of sample data, at least two types of reference value data associated with a dynamic range of sample data of each block is formed in units of blocks, the sample data of each block is coded by using the reference value data to form a plurality of first coded data in units of blocks, the plurality of first coded data formed in units of blocks are vector-quantized to form second coded data in units of blocks, and transmission data is formed by using as a transmission unit the reference data formed in units of blocks and the second coded data formed in units of blocks. The image information signal can be transmitted in a small information volume without degrading the image information signal.

16 Claims, 31 Drawing Sheets

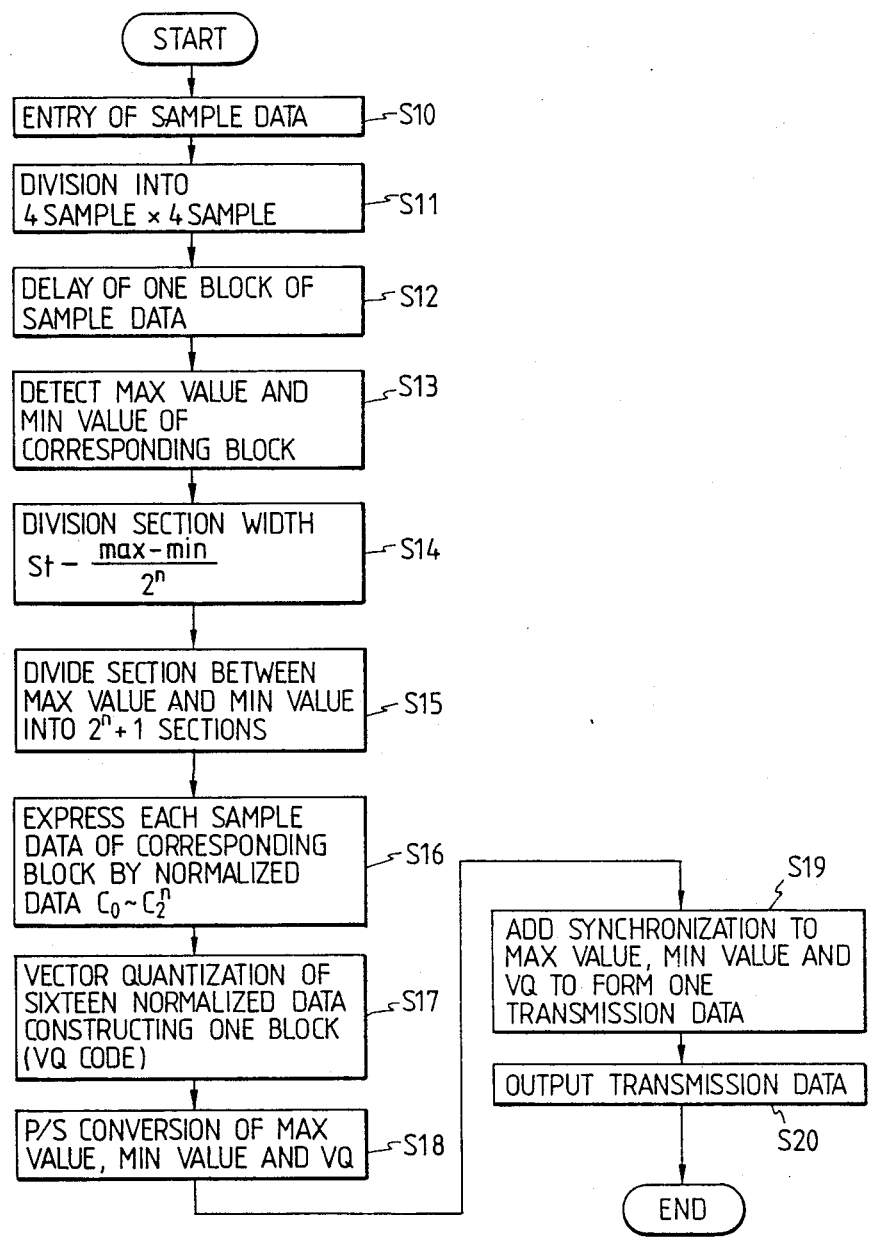

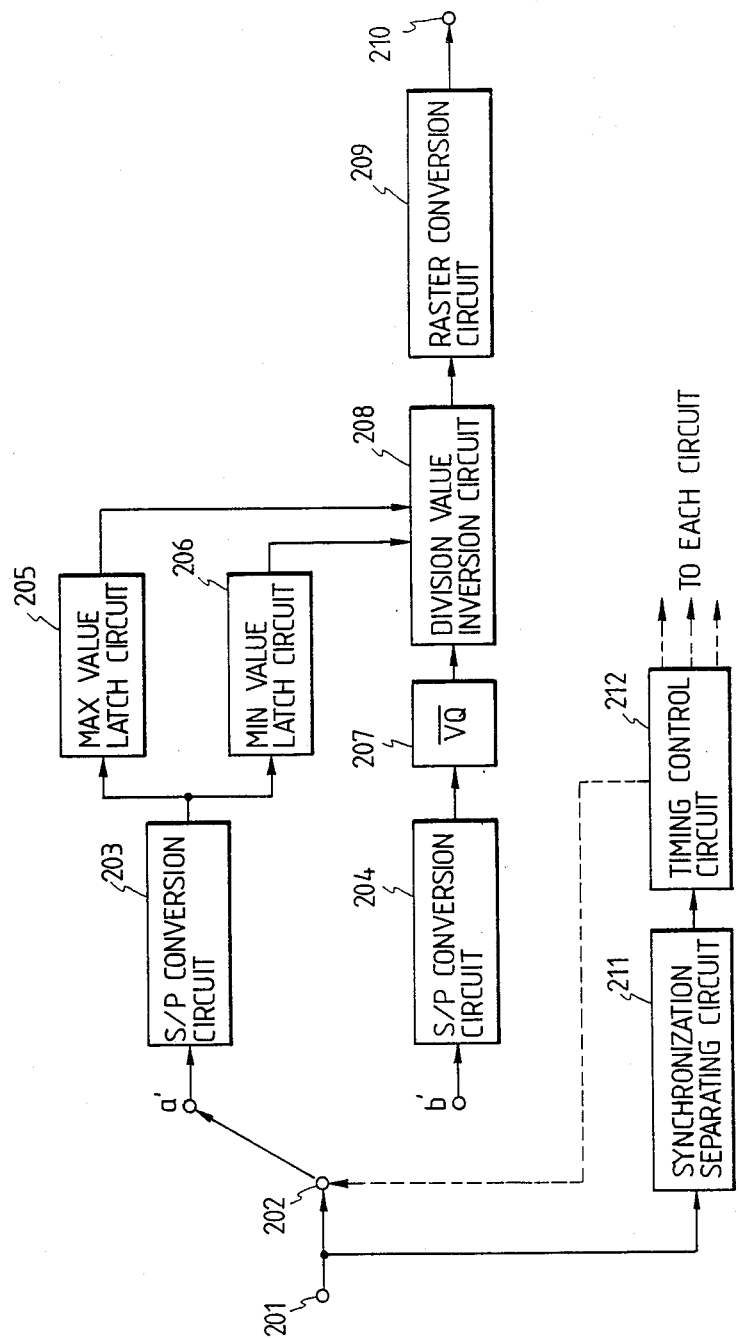

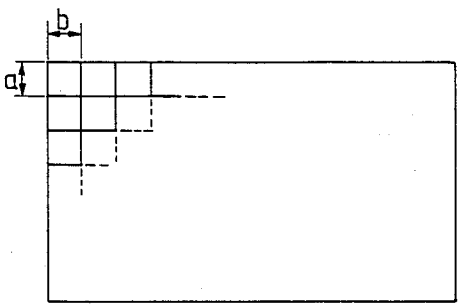
FIG. 13
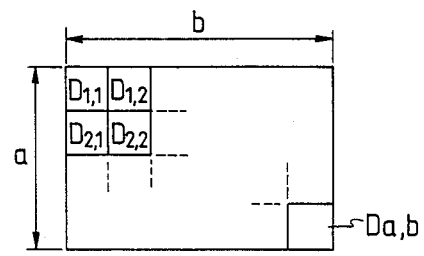
FIG. 14
FIG. 15
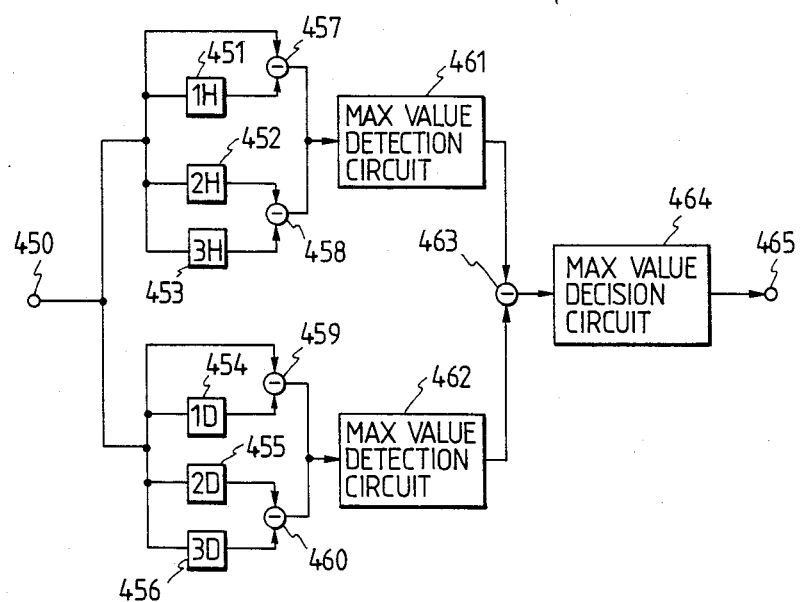

| | | |
|---|---|---|
| FIG. 37A | MAX \| MIN \| VQ | |
| FIG. 37B | MIN \| MAX \| VQ | |
| FIG. 37C | SYNC \| MAX \| MIN \| VQ | |
| FIG. 37D | SYNC \| MIN \| MAX \| VQ | |

IMAGE INFORMATION SIGNAL TRANSMISSION APPARATUS

BACKGROUND OF THE INVENTION:

1. Field of the Invention

The present invention relates to an image information signal transmission apparatus for transmitting an image information signal.

2. Related Background Art

A conventional method of reducing a sampling frequency and another conventional method of reducing the number of average bits of sample data per sample are known as methods of reducing a transmission bandwidth of an image information signal such as a television (TV) signal. According to the former method, a subsampling point obtained by reducing the number of samples into ½ by subsampling and a flag representing a position of another subsampling point used in interpolation (this flag is a positional information data representing that sample data of any one of the four adjacent subsampling points with respect to an interpolation point is used) are transmitted.

According to one of the examples of the latter method, a one-field image is divided into small blocks, and sample data within each block is encoded. This method is known as a block coding method. According to the block coding method, for example, a difference between the minimum (MIN) and maximum (MAX) values of the sample data within any block is quantized linearly or nonlinearly, and index data which represents a quantization level to which the quantized value belongs in units of samples is transmitted, and the MAX and MIN value data are transmitted as scale components.

According to this conventional block coding method, sample data within each block is coded in correspondence with its dynamic range. For example, if sample data having an extremely large level difference is present in the block, or sample data representing a boundary between the images is present in the block, i.e., if a sample data distribution is greatly different from a preset distribution, the decoded image information signal is greatly degraded.

When the dynamic range of the sample data within the block is quantized to suppress the degradation of the image during decoding, the number of quantization levels or the number of quantization bits can be increased. However, the volume of transmission information is increased, and a good data compression effect cannot be expected.

SUMMARY OF THE INVENTION

It is an object of the present invention to provide an image information signal transmission apparatus capable of solving the conventional problems described above.

It is another object of the present invention to provide an image information signal transmission apparatus capable of transmitting the image information signal in a small volume of information.

In order to achieve the above objects according to an aspect of the present invention, there is provided an image information signal transmission apparatus comprising:

blocking means for inputting an image information signal in which one frame is constituted by a plurality of sample data and for forming a plurality of blocks each consisting of a predetermined number of sample data;

reference value data forming means for forming at least two types of reference value data associated with a dynamic range of the sample data within each block in units of blocks formed by the blocking means;

first coding means for coding the sample data within each block by using the reference value data formed by the reference value data forming means and for forming a plurality of first coded data in units of blocks;

second coding means for vector-quantizing the plurality of coded data formed by the first coding means and for forming second coded data in units of blocks; and transmission data forming means for forming transmission data by using as a transmission unit the reference value data formed by the reference value data forming means in units of blocks and the second coded data formed by the second coding means in units of blocks.

It is still another object of the present invention to provide an image information signal transmission apparatus capable of transmitting the image information signal in a small volume of information without degrading the image information signal.

In order to achieve this object according to another aspect of the present invention, there is provided an image information signal transmission apparatus comprising:

blocking means for inputting an image information signal in which one frame is constituted by a plurality of sample data and for forming a plurality of blocks each consisting of a predetermined number of sample data;

reference value data forming means for forming at least two types of reference value data associated with a dynamic range of the sample data within each block in units of blocks formed by the blocking means;

first coding means for coding the sample data within each block by using the reference value data formed by the reference value data forming means and for forming a plurality of first coded data in units of blocks;

second coding means for vector-quantizing the plurality of coded data formed by the first coding means in units of blocks and for forming second coded data in units of blocks;

control means for controlling a formation operation of the second coding means for forming the second coded data in accordance with a state of each block formed by the blocking means; and transmission data forming means for forming transmission data by using as a transmission unit the reference value data formed by the reference value data forming means in units of blocks and the second coded data formed by the second coding means in units of blocks.

The above and other objects, features, and advantages of the present invention will be apparent from the detailed description of preferred embodiments in conjunction with the accompanying drawings.

BRIEF DESCRIPTION OF THE DRAWINGS

FIG. 8 is a flow chart for explaining a transmission operation of the transmission system in the image information signal transmission apparatus shown in FIG. 6;

FIG. 9 is a block diagram showing an arrangement of a reception system corresponding to the transmission system in the image information signal transmission apparatus shown in FIG. 6;

FIG. 13 is a view for explaining blocking of sample points of a frame;

FIG. 14 is a view showing assignment of sample data $D_{i,j}$ in each block;

FIG. 15 is a block showing an arrangement of a decision circuit in FIG. 12;

FIGS. 16A and 16B show combinations in vector quantization every two samples in a block consisting of 6 sample points, in which FIG. 16A shows a combination in the horizontal direction, and FIG. 16 B shows a combination in the vertical direction;

FIGS. 17A and 17B show formats of transmission data series formed from the transmission system in the image information signal transmission apparatus shown in FIG. 12, in which FIG. 17A shows a format in which the samples in vector quantization are combined in the horizontal direction, and FIG. 17B shows a format in which the samples in vector quantization are combined in the vertical direction;

FIGS. 24A and 24B show formats of transmission data series formed by the transmission system in the image information signal transmission apparatus shown in FIG. 20, in which FIG. 24A shows a case wherein a change in direction selection is present in at least one small block in a given block of the first or previous frame in image sample data transmission processing, and FIG. 24B is a case in which no change in all small blocks occurs;

FIGS. 37A to 37D are views showing a format of a transmission data series formed by the transmission system in the image information signal transmission apparatus shown in FIG. 36;

DETAILED DESCRIPTION OF THE PREFERRED EMBODIMENTS:

The present invention will be described in detail with reference to preferred embodiments.

Figure 1:
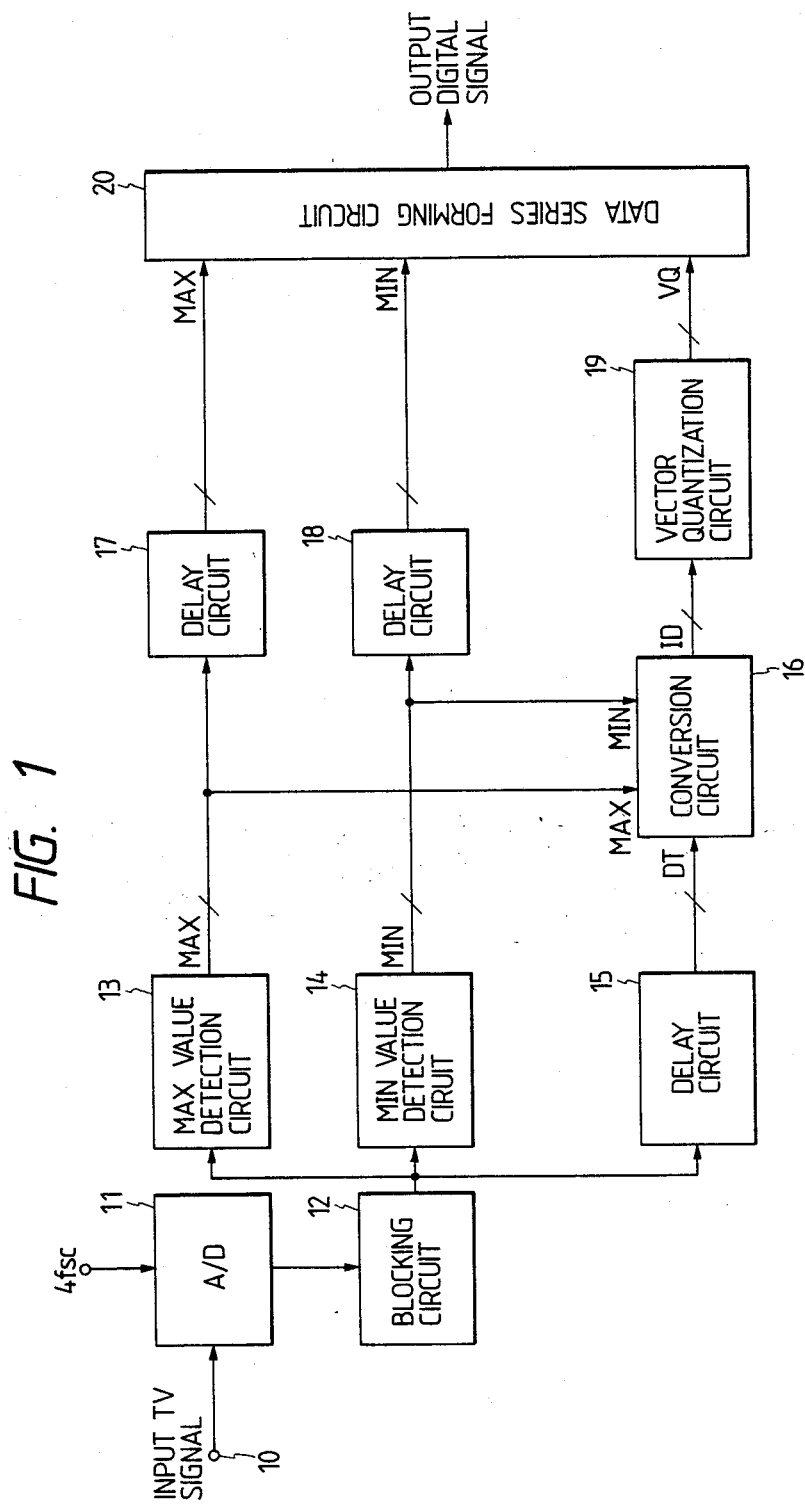
FIG. 1 is a block diagram showing an arrangement of a transmission system in an image information signal transmission apparatus according to a first embodiment of the present invention.
Figure 2:
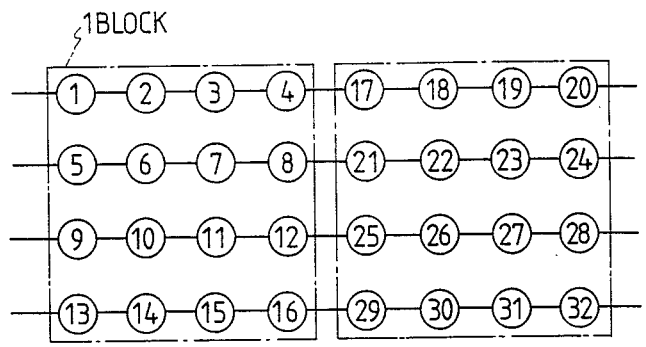
FIG. 2 is a view for explaining blocking of sample points of a frame.

FIG. 1 is a block diagram showing an arrangement of a transmission system in an image information signal transmission apparatus according to a first embodiment of the present invention. An input terminal 10 receives an image signal. The image signal used in this embodiment is a television (TV) signal complying with an NTSC scheme. The NTSC TV signal is input to the input terminal 10. An A/D converter 11 samples the TV signal input to the input terminal 10 at a sampling frequency four times a subcarrier frequency $f_{SC}$ and forms sampling data (8 bits/sample). A blocking circuit 12 sequentially receives the sample data in units of horizontal scanning lines and stores them in a temporary memory. The blocking circuit 12 reads out the sample data from the temporary memory in an order different from the read order, thereby converting the scanning order of each block in units of horizontal scanning lines. In this embodiment, in the blocking circuit 12, each block consists of four samples in the horizontal direction and four lines in the vertical direction, as shown in FIG. 2. The blocking circuit 12 changes an order of the sample points represented by circles and input in a scanning order represented by the solid line in accordance with an order represented by numbers given to the sample points.

The sample data series (DT) reordered by the blocking circuit 12 is supplied to a MAX (maximum) value detection circuit 13, a MIN (minimum) value detection circuit 14, and a delay circuit 15.

Of all input sample data, the MIN value detection circuit 14 detects sample data representing a minimum value (MIN) and outputs the detected sample data. Of all the input sample data, the MAX value detection circuit 13 detects sample data representing a maximum value (MAX) and outputs the detected data.

The delay circuit 15 delays the sample data by time required to cause the MAX and MIN value detection circuits 13 and 14 to detect the MAX and MIN values. The timings of the sample data DT input from the blocking circuit 12 to a conversion circuit 16, the MIN data output from the MIN value detection circuit 14, and the MAX data output from the MAX value detection circuit 13 are adjusted by the delay circuit 15.

The MIN and MAX data output from the MIN and MAX value detection circuits 14 and 13 are input to the conversion circuit 16.

The conversion circuit 16 also receives the sample data DT delayed by the delay circuit 15 and quantizes DR (=MAX−MIN) on the basis of the MAX and MIN data and outputs index data ID representing a quantization level to which the data DT belongs. The conversion operation will be described in detail later. The MIN and MAX data output from the MIN and MAX value detection circuits 14 and 13 are input to delay circuits 18 and 17, respectively. The delay circuits 17 and 18 serve as circuits for adjusting the timings between the index data ID output from the conversion circuit 16 and the MIN data output from the MIN value detection circuit 14 and between the index data ID and the MAX data output from the MAX value detection circuit 13.

Since a dynamic range DR of one-block sample data DT is divided into 32 levels (corresponding to five bits), the conversion circuit 16 of this embodiment can output 5-bit index data ID representing a dynamic range DR level to which each sample data DT belongs.

The 5-bit index data ID serves as normalized data in which a variation in absolute level in units of blocks and a variation in dynamic range are eliminated.

The index data ID output from the conversion circuit 16 as described above is input to a vector quantization circuit 19.

Vector quantization will be briefly described below. According to the vector quantization scheme, an input signal is blocked every a plurality of samples, and vector quantization is performed for a k-dimensional (k is an integer of 2 or more) space constituted or constructed by k samples. In particular, if correlation between the samples is high, the number of codes (code book) derived from combinations of k-dimensional sample data can be greatly reduced, and high-efficient coding can be performed. For example, in order to constitute one block by 16 sample data, a 16-dimensional space is subjected to vector quantization. If PCM (Pulse-Coded Modulation) transmission of a data series (8 bits/sample) is to be performed, a volume of information is 128 bits (=8 bits×16 samples). When this is vector-quantized by $2^{32}$ code books, it can be expressed by 32 bits/block. Therefore, the volume of information can be reduced to ¼ (=32/128).

The vector quantization circuit 19 performs simultaneous vector quantization in 16-dimensional space constituted by the index data ID of 16 samples formalized by the conversion circuit 16. The index data of 80 bits (=16 samples×5 bits) is expressed by 8-bit code book data (VQ) and is output. Note that the vector quantization circuit 19 can be easily arranged by a ROM (Read-Only Memory). The data series of the index data ID is used as an address signal to access the code book data VQ.

The MAX data delayed by the delay circuit 17, the MIN data delayed by the delay circuit 18, and the code book data VQ output from the vector quantization circuit 19 are supplied to a data series forming circuit 20. The data series forming circuit 20 converts these input data into a serial data series and adds sync code (SYNC) data thereto. Therefore, the data series forming circuit 20 outputs the SYNC data, the MAX data, the MIN data, and the code book data VQ to a transmission line or an external recording device in the order named.

As described above, the volume of data of each block can be compressed from 128 bits (=16 samples×8 bits) into 24 bits (=MAX (8 bits)+MIN (8 bits)+VQ (8 bits)). In this case, a data compression ratio is 3/18.

Figure 4:
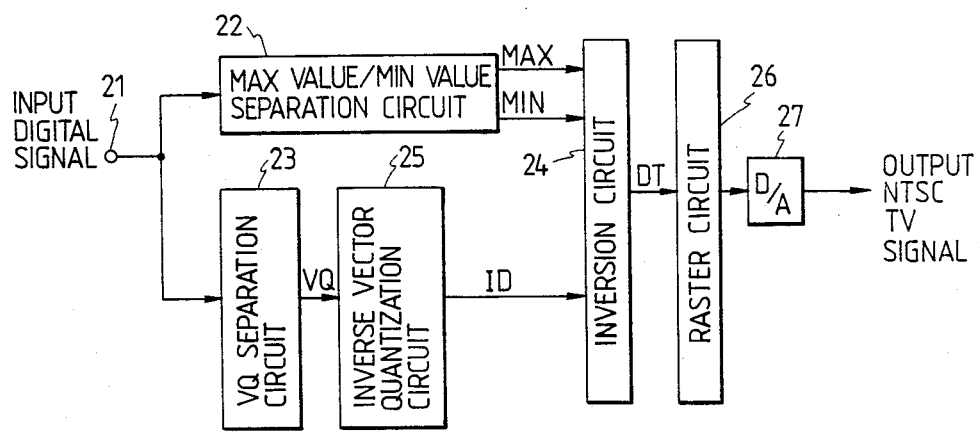
FIG. 4 is a block diagram showing an arrangement of a reception system corresponding to the transmission system in the image information signal transmission apparatus shown in FIG. 1.

FIG. 4 is a schematic block diagram showing an arrangement of a reception system in the image information signal transmission apparatus shown in FIG. 1. A digital TV signal input from a transmission line (not shown) is supplied from an input terminal 21 to a MAX data/MIN data separation circuit 22 and a code book data (VQ) separation circuit 23. The MAX data/MIN data separation circuit 22 separates and outputs the MAX and MIN data. The VQ separation circuit 23 separates and outputs the data VQ. Since the data series supplied to each separation circuit is a fixed-length code in units of blocks, each data separation can be performed such that a clock generator (not shown) is oscillated in synchronism with SYNC data to form a clock signal synchronized with the data, and gate circuits (not shown) are enabled at different timings in units of data.

The code book data VQ separated by the code book data (VQ) separation circuit 23 is supplied to an inverse vector quantization circuit 25. The inverse vector quantization circuit 25 inverse-quantizes the input code book data VQ. That is, the inverse vector quantization circuit 25 converts the 8-bit code book data VQ into the original index data ID (=16 samples×5 bits) and outputs the index data ID. The inverse vector quantization circuit 25 comprises a ROM table in the same manner as in the vector quantization circuit 19. The code book data VQ is used as an address signal to access the corresponding index data ID.

An inversion circuit 24 restores the MIN and MAX data separated by the separation circuit 22 and the sample data DT from the index data ID output from the inverse vector quantization circuit 25. The MAX and MIN data and the sample data DT are supplied to a raster circuit 26. The raster circuit 26 temporarily stores the input sample data DT in a memory and outputs them in an order indicated by the solid line in FIG. 2, thereby converting the input data into raster data. The raster data is supplied to a D/A converter 27. The D/A converter 27 converts the input sample data DT into an analog signal by using the sampling frequency $4f_{SC}$ as a sync signal, thereby decoding the TV signal.

In the first embodiment described above, as preprocessing of vector quantization, the difference between the maximum and minimum values of the sample data within the block is divided into 32 levels, and each sample data is converted into the index data representing a corresponding division value. However, the present invention is not limited to the above preprocessing. For example, the difference between the MIN and MAX values may be divided into 16 levels (corresponding to 4 bits) and each sample data may be normalized into 4-bit index data. Thereafter, the 4-bit index data may be vector-quantized. The number of samples constituting each block in preprocessing need not be equal to the number of samples combined in vector quantization. For example, a compression ratio of the information volume is set to be ½, the number of samples constituting the block in preprocessing can be 32 (=4×8) (i.e., the data volume is given as 256 bits). This block can be normalized into data having a total of 144 bits (i.e., an 8-bit MAX value, an 8-bit MIN value, and 4-bit sample data). The 4-bit sample values are subjected to two-dimensional vector quantization every two samples. In this case, when data is compressed into 7-bit data/two samples, it is confirmed that less image quality degradation occurs.

In this embodiment, the vector quantization circuit and the inverse vector quantization circuit are constituted by ROM tables. However, the present invention is not limited to this.

In the first embodiment as described above, after the image information signal is normalized by utilizing local correlation, vector quantization is performed. Therefore, the image information signal can be transmitted in a small information volume without degrading the image quality.

Figure 5:
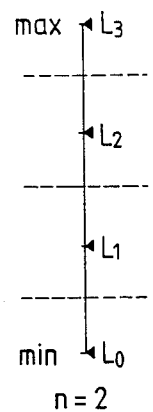
FIG. 5 is a view showing a normalization system.

In the first embodiment described above, as one of the normalizing techniques, the sample data obtained by sampling the TV signal is divided into small blocks, and the difference between the MIN and MAX values represented by the MIN and MAX values is divided into $2^n$ sections, and k (k≧2) n-bit ID data each representing a section to which each sample data belongs are vector-quantized, as shown in FIG. 5.

However, the normalizing scheme for dividing the difference into sections shown in FIG. 5 is effective to accurately restore the values of the MIN and MAX data since a representative normalized value $L_i$ (0≦i≦n−1) for minimizing a normalizing error must be a central value in each section. The difference (MAX−MIN) must be divided by $2^n-1$ at the time of calculation of division steps, i.e., the number of division sections. In general, when a division except for a power of two is performed in a digital arithmetic circuit, a complicated circuit is required as compared with the calculation of a power of two. Therefore, this is not undesirable in view of calculation precision.

A second embodiment of the present invention exemplifies an image information signal transmission apparatus which can use the simple digital circuit described above and provide high-precision normalization.

The second embodiment of the present invention will be described in detail with reference to the accompanying drawings. An image information signal is sample data quantized (8 bits/sample) by sampling a TV signal at the sampling frequency $4f_{SC}$.

A transmission method of the second embodiment will be described below.

Figure 7:
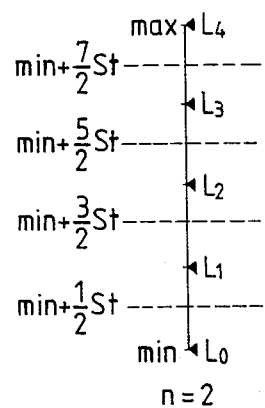
FIG. 7 is a view for explaining a normalization system in the second embodiment.
Figure 6:
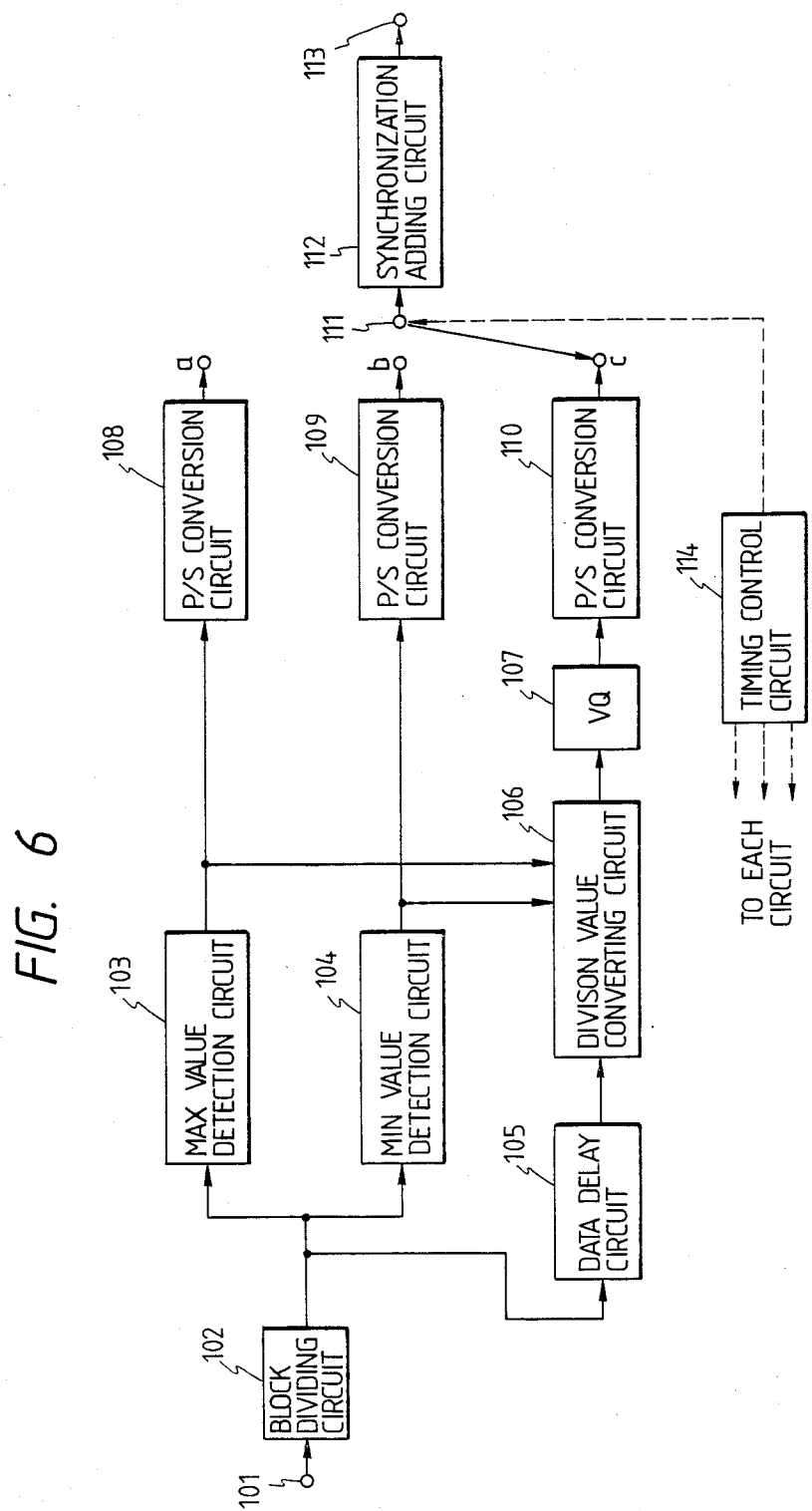
FIG. 6 is a block diagram showing an arrangement of a transmission system in an image information signal transmission apparatus according to a second embodiment of the present invention.

FIG. 6 is a block diagram showing an arrangement of a transmission system in an image information signal transmission apparatus according to the second embodiment. FIG. 7 is a view for explaining a normalizing technique in the second embodiment.

The transmission system in the image information signal transmission apparatus includes an input terminal 101 for receiving each parallel sample data, and a block dividing circuit 102 for dividing the sample data series input from the input terminal 101 into blocks each consisting of 4 samples×4 samples. The block dividing circuit 102 has a function for converting the sample data input in an order of "1", "2", "3", "4", "17", "18", . . . added to the sample data shown in FIG. 2 to output the sample data in an order of "1", "2", "3", "4", "5", "6", . . . As shown in FIG. 2, a portion surrounded by the alternate long and short dashed line is defined as one normalizing block. Of the sample data within each block divided by the block dividing circuit 102, a MAX value detection circuit 103 detects sample data representing a maximum value. Of the sample data within each block divided by the block dividing circuit 102, a MIN value detection circuit 104 detects sample data representing a minimum value. A data delay circuit 105 delays the sample data by a time required to detect the maximum and minimum values of the sample data within the block.

A division value converting circuit 106 divides one block sample data output from the data delay circuit 105 on the basis of the sample data (to be referred to as MAX data hereinafter) representing the maximum value output from the MAX value detection circuit 103 and sample data (to be referred to as MIN data hereinafter) representing the minimum value output from the MIN value detection circuit 104. The division value converting circuit 106 calculates $(MAX-MIN)/2^n$ ($0<n<$ number of bits of sample data) using a difference between the maximum and minimum values to define a division section width St. The division section width St is divided into ($2^n+1$) sections, i.e., Min to Min+($\frac{1}{2}$)St, MIN+($\frac{1}{2}$)St to MIN+(3/2)St, ... MIN+($2^{n+1}-1$)St/2 to MAX. The correspondence between the sample data and each section is represented by ($2^n+1$) normalized codes $C_0$ to $C_{2n}$. The calculations of the division section width St can be performed by subtractions between the maximum and minimum values and division of a power of two. These calculations can be performed by a digital circuit including a subtracter and a bit shift circuit. The normalized cods $C_0$ to $C_{2n}$ are codes free from variations in absolute levels of the sample data and variations in dynamic range. A representative normalized value $L_i$ ($0 \leq i \leq n-1$) is set as a central value in each section.

A vector quantization circuit 107 (to be referred to as a VQ hereinafter) performs parallel vector quantization of the normalized codes $C_0$ to $C_{2n}$ in the 16-dimensional space obtained by grouping 16 samples and expresses 16-sample data as an 8-bit code book. Parallel/serial (to be referred to as P/S hereinafter) conversion circuits 108, 109, and 110 convert the 8-bit parallel data output from the MAX value detection circuit 103, the 8-bit parallel data output from the MIN value detection circuit 104, and 8-bit parallel data output from the VQ 107 into serial data. A switching circuit 111 is sequentially set to be the a, b, and c terminals to supply the block data to a synchronization adding circuit 112. The synchronization adding circuit 112 compresses the data string supplied from the switching circuit 111 along the time base and adding a sync signal SYNC in a form shown in FIG. 3. The transmission data output from the synchronization adding circuit 112 appears at an output terminal 113. A timing control circuit 114 controls timings of the respective circuits.

In the apparatus shown in FIG. 6, 128-bit (=16 samples×8 bits) data per block can be compressed into 24 bits (=8 bits×3). In this case, a compression ratio is 3/16.

An operation of a transmission side of the image information signal transmission apparatus having the above arrangement will be briefly described below. In this case, the operation of hardware will be described.

FIG. 8 is a flow chart for explaining the transmission operation of this embodiment.

Sample data is input from the input terminal 101 (step S10) and is divided into a block of sample data consisting of 4 samples×4 samples (step S11). The sample data constituting one block are supplied to one data delay circuit 105 and latched thereby (step S12). The sample data constituting one block are supplied to the MAX and MIN value detection circuits 103 and 104 to detect the maximum and minimum values (step S13). The division section width St is calculated by the division value converting circuit 106 and is divided into ($2^n+1$) sections (step S15), and the VQ 107 determines the correspondence between the sample data of the corresponding block and the sections obtained in step S15 and generates normalized codes $C_0$ to $C_{2n}$ of the corresponding sections (step S16). The sample data constructing one block are expressed as 8-bit vector quantized data on the basis of the 16 normalized codes or data (step S17). The vector-quantized data is referred to as a VQ code for expressive convenience.

The MAX data output from the MAX value detection circuit 103, the MIN data output from the MIN value detection circuit 104, and the VQ code are converted into serial data by the P/S converters (step 18). Upon switching of the terminals of the timing control circuit 114, the synchronization adding circuit 112 forms transmission data corresponding to this block (step S19). This transmission data is externally output from the output terminal 113 (step S20).

A reception method of this embodiment will be described below.

FIG. 9 is a block diagram showing an arrangement of a reception system in the image information signal transmission apparatus of this embodiment.

Referring to FIG. 9, the reception system includes an input terminal 201 for receiving data in the form of transmission data formed by the above transmission processing. A sync signal of the "receive" data input to the input terminal 201 is extracted by a synchronization separating circuit 211. A switching circuit 202 switches the reception data input to the input terminal 201 between the a' or b' terminal. More specifically, the switching circuit 202 supplies the MAX and MIN data to the a' terminal and the VQ data to the b' terminal. Serial/parallel (to be referred to as S/P hereinafter) conversion circuits 203 and 204 convert input serial data into 8-bit parallel data. A MAX value latch circuit 205 latches the MAX data supplied from the S/P conversion circuit 203. A MIN value latch circuit 206 latches the MIN data supplied from the S/P conversion circuit 203. The MAX and MIN latch circuits 205 and 206 have a function for latching the MAX and MIN data until the MAX and MIN data of the next block are input.

An inverse vector quantization circuit 207 (to be referred to as a $\overline{VQ}$ hereinafter) for inverse-quantizing the 8-bit VQ data into a normalized code of 16 sample data. A division value inversion circuit 208 performs inversion operation of the division value converting circuit 106. The division value inversion circuit 208 receives the MAX and MIN data in units of blocks and calculates a division section width St, i.e., (MAX-MIN)/$2^n$ (where n is a value in the division value converting circuit 106) and sets the representative division values $L_i$ ($0 \leq i \leq n$) as center values such as MIN+St, MIN+2St, ..., MIN+($2^n-1$)St, and MAX. The division value inversion circuit 208 outputs representative value data of the sections corresponding to the normalized codes of the samples supplied from the VQ 207. In this case, the calculations of the division segment width St can be realized by a digital circuit including a subtracter and a bit shift circuit.

A raster conversion circuit 209 performs inverse conversion of the block dividing circuit 102 shown in FIG. 6 and converts the output from the division value inversion circuit 208 into a raster signal. The raster signal output from the raster conversion circuit 209 appears at an output terminal 210 and can be externally output therefrom. The synchronization separating circuit 211 separates a sync signal SYNC from the reception data supplied from the input terminal. A timing control circuit 212 generates various timing control signals on the basis of the sync signal SYNC supplied from the synchronization separating circuit 212.

An operation of a reception system in the image information signal transmission apparatus having the above arrangement will be briefly described. In this case, the operation by hardware will be exemplified.

Figure 10:
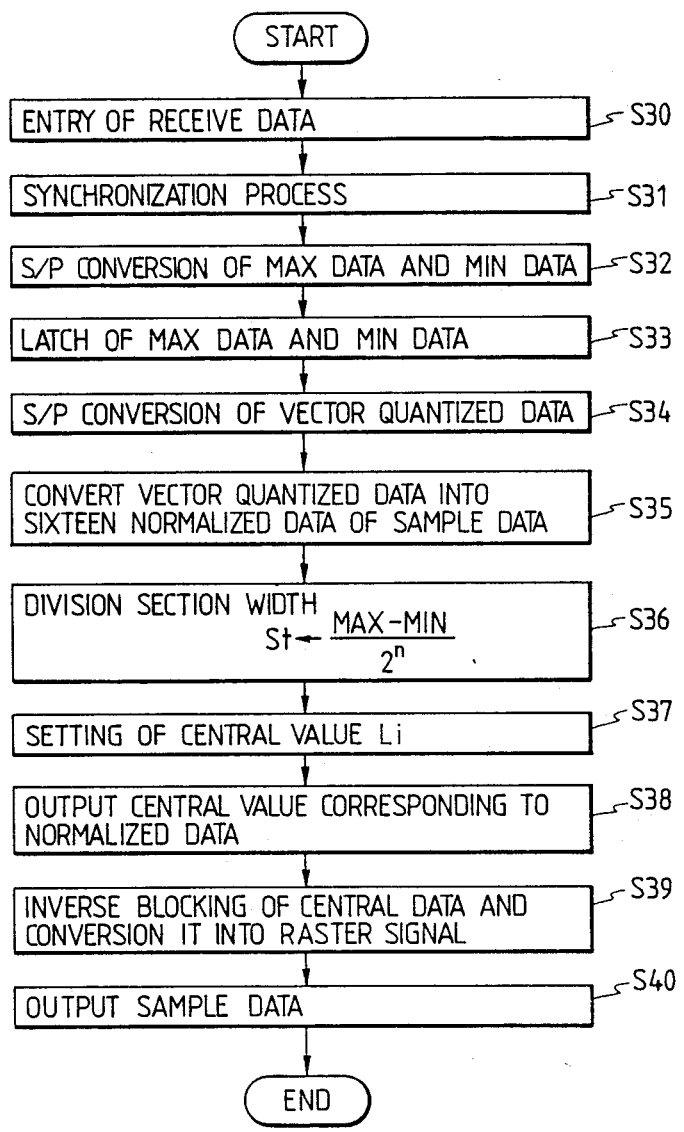
FIG. 10 is a flow chart for explaining a reception operation of the reception system in the reception system in the image information signal transmission apparatus shown in FIG. 9.

FIG. 10 is a flow chart for explaining a reception operation of this embodiment.

Upon entry of the transmission data (FIG. 3) as "receive" data at the input terminal 201 (step S30), the sync signal SYNC is separated from the "receive" data (step S31). The sync signal SYNC is supplied to the timing control circuit 212. The timing control circuit 212 controls switching of the switching circuit 202 on the basis of the sync signal SYNC. Upon switching control, the MAX and MIN data of the "receive" data are converted into parallel data through the a' terminal. In addition, the MAX data is latched by the MAX value latch circuit 205 and the MIN data is latched by the MIN value latch circuit 206 (steps S32 and S33). The VQ code data is converted into parallel data by the S/P conversion circuit 204 through the b' terminal, so that the $\overline{VQ}$ data as parallel data converted by the VQ 207 is converted into a normalized code as 16-sample data (steps S34 and S35). The division section with St is then calculated (step S36), and the representative values Li of the respective sections within the division section width St are set (step S37). The normalized codes obtained in step S35 are decoded in correspondence with the representative values Li. The decoded 16-sample data is then converted into block data by the raster conversion circuit 209, thereby restoring a raster signal representing four rasters (steps S38 and S39). The sample data by the raster signal obtained in step S39 is externally output (step S40).

According to this embodiment as described above, in the vector quantization system using normalized data, sample data normalization calculations can be easily performed by a digital circuit thereby realizing a coding system suitable for an LSI. In addition, a quantization step interval is smaller than that of the conventional arrangement at the time of sample data normalization. Therefore, normalization errors can be reduced, and quality of the restored image can be improved.

As a modification of this embodiment, a method of reducing a volume of hardware by using a ROM table as a VQ will be described below.

The VQ of this embodiment may use any algorithm such as a retrieval type algorithm if it can process input vectors which represent $(2^n+1)$ (where n is the value in the division value converting circuit 106) states. As compared with the first embodiment using $2^n$ normalized codes, the number of input vector states is increased by one. However, when the VQ is constituted by a ROM table to realize high-speed processing, an output from the division value converting circuit is a $(2^n+1)$-bit signal in order to represent (n+1) normalized data. Therefore, the capacity of the ROM upon an increase in input vector state by one is doubled per dimension. When a k-dimensional vector quantization table is used, its capacity must be $(2^n+1)^k \times M$ bits (where M is the number of bits after vector quantization). However, the data capacity required within the ROM capacity is a capacity of $(2^n+1)^k \times M$ bits. Therefore, the ROM capacity can be reduced depending on the VQ arrangement.

Figure 11:
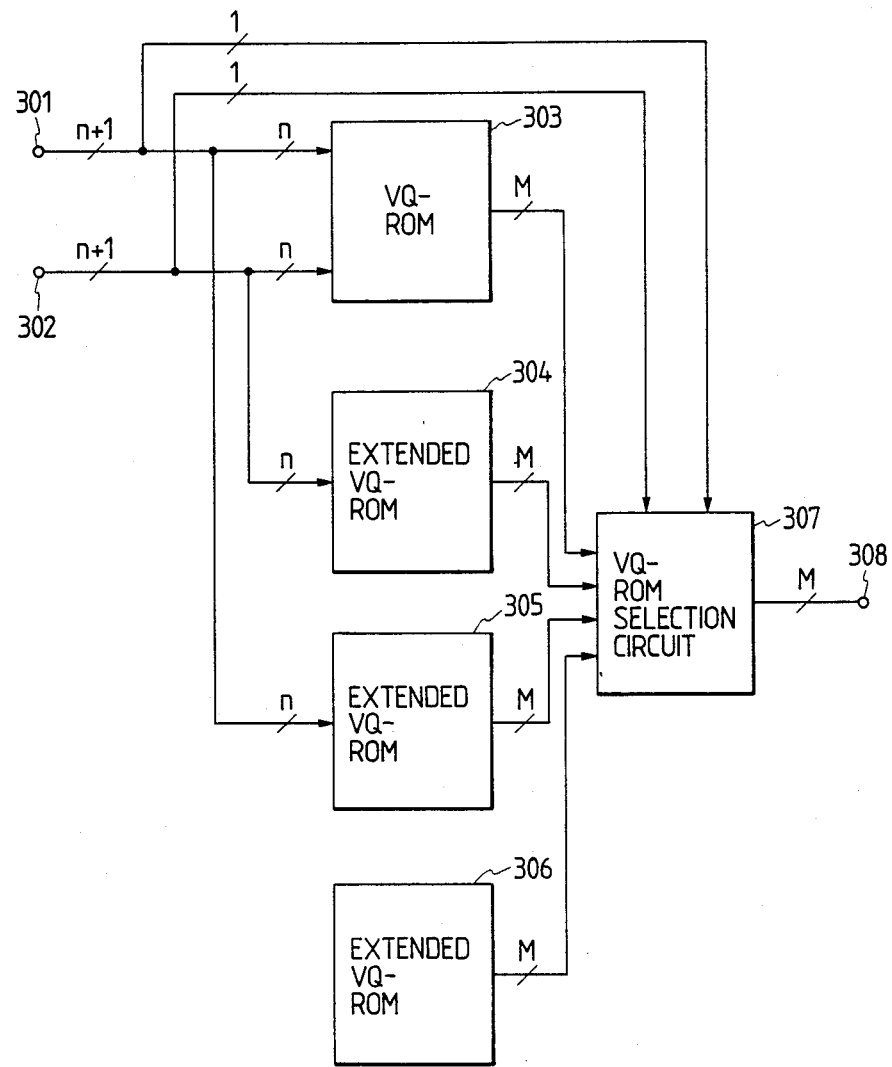
FIG. 11 is a block diagram showing an arrangement of a vector quantization circuit for performing two-dimensional vector quantization according to a modification of the second embodiment.

FIG. 11 shows a VQ arrangement for performing two-dimensional vector quantization (k=2) according to a modification of the second embodiment. An arrangement except for the VQ arrangement in this modification is the same as that in the second embodiment of FIG. 6. Of the normalized data in units of 4 samples×4 samples, every two normalized codes are subjected to two-dimensional quantization. Referring to FIG. 11, input terminals 301 and 302 receive two (n+1)-bit signals each representing a normalized code. The input terminals 301 and 302 have a function for performing appropriate delay processing so as to receive two parallel inputs by a predetermined combination of outputs from the division value converting circuit 106 in the second embodiment of FIG. 6. If one upper bit of the signal input to the input terminals 301 and 302 is set to be "1", it represents a normalized code $C_{2n-1}$ regardless of the values of the lower bits. A VQ-ROM 303 outputs an M-bit code corresponding to an input signal when both the input signals supplied to the input terminals 301 and 302 belong to the normalized codes $C_0$ to $C_{2n-1}$. The VQ-ROM 303 has a capacity of $2^{2n} \times M$ bits.

Extended VQ-ROMs 304 and 305 are used to increase the capacity to $(2n \times M)$ bits each in accordance with the lower n bits of the other input signal when one input signal to a corresponding one of the input terminals 301 and 302 is $C_{2n}$. An extended VQ-ROM 306 comprises an M-bit memory having a fixed output when both the signals input to the input terminals 301 and 02 are $C_{2n}$. A VQ-ROM selection circuit 307 selects outputs output from the VQ-ROM 303, the extended VQ-ROMs 303 to 306 in accordance with one upper bit of each of the signals input to the input terminals 301 and 302 and outputs an M-bit signal. An output terminal 308 outputs the M-bit code from the VQ-ROM selection circuit 307 to a P/S conversion circuit having the same arrangement as in the second embodiment shown in FIG. 6.

According to the above modification of the second embodiment, a necessary ROM capacity can be a minimum capacity of $(2^{2n}+2\times 2^n+1)\times M$ bits as a total capacity of the VQ-ROM 303 and the extended VQ-ROMs 304, 305, and 306. Even if low-dimensional vector quantization for high-speed processing can be achieved without greatly increasing the capacity when it is performed by using ROMs.

The modification of the second embodiment exemplifies two-dimensional vector quantization. However, the present invention is not limited to this. ROMs for storing $(2^n+1)^k$ states are arranged, and one of the ROMs is selected by a combination of one upper bit of one input signal and one upper bit of the other input signal, thereby obtained a smallest ROM arrangement.

According to the second embodiment and its modification, the operation speed and efficiency by the digital circuit can be achieved, and transmission of the image information signal with less image quality degradation can be performed.

A third embodiment of the present invention will be described with reference to the accompanying drawings.

Figure 12:
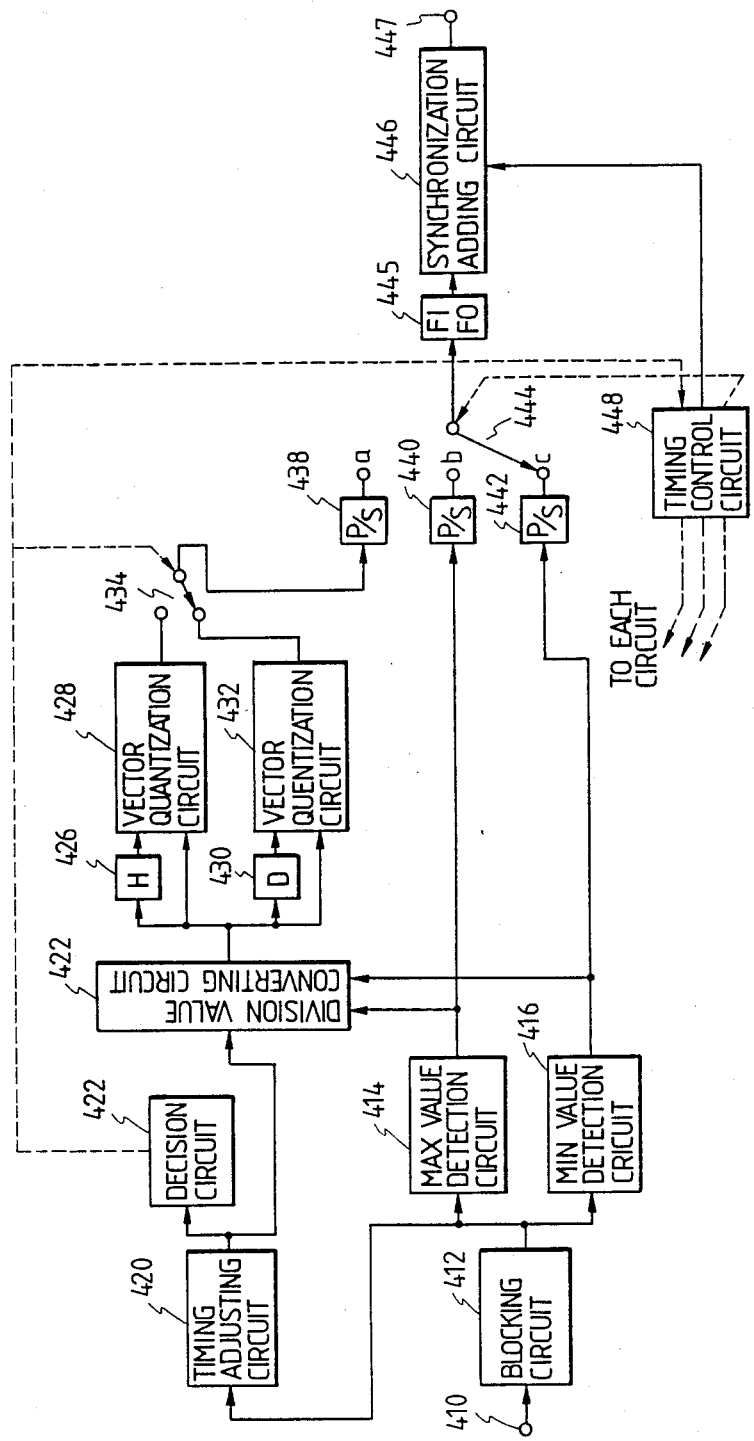
FIG. 12 is a block diagram showing an arrangement of a transmission system in an image information signal transmission apparatus according to a third embodiment of the present invention.

FIG. 12 is a block diagram of a transmission system in an image information signal transmission apparatus according to the third embodiment of the present invention. An input terminal 410 receives an n-bit sample data (i.e., digital image data of $2^n$ gradation levels). The input sample data is formed such that a raster-scanned analog image signal such as a television signal is sampled at a predetermined frequency (e.g., $4f_{SC}$) and the sample data is linearly quantized. A blocking circuit 412 converts the sample data input from the input terminal 410 into blocks, as shown in FIG. 13. Each block includes a sample points in the vertical direction and b sample points in the horizontal direction. The blocking circuit 412 divides a frame into a plurality of blocks. In the following description, sample data in each block is represented by $D_{i,j}$ (i=1 to a and j=1 to b), as shown in FIG. 14.

The sample block data output from the blocking circuit 412 is supplied to a MAX value detection circuit 414, a MIN value detection circuit 416, and a timing adjusting circuit 420 in a predetermined order. The MAX value detection circuit 414 detects a maximum value Dmax of all the sample data constituting each sample. The MIN value detection circuit 416 detects a minimum value Dmin. The timing adjusting circuit 420 adjusts detection processing time of the MAX and MIN value detection circuits 414 and 416. An output from the blocking circuit 412 is delayed by the detection processing time. The delayed sample data from the timing adjusting circuit 420 is supplied to a division value converting circuit 422 and a decision circuit 424. The division value converting circuit 422 also receives the maximum and minimum values Dmax and Dmin detected by the MAX and MIN value detection circuits 414 and 416. The division value converting circuit 422 compares the sample data $D_{i,j}$ with quantization levels obtained by dividing a difference between the maximum and minimum values Dmax and Dmin by $2^k$ and outputs a k-bit division code $\Delta_{i,j}$ ($\Delta_{1,1}$ to $\Delta_{a,b}$).

An output from the division value converting circuit 422 is further quantized. More specifically, the output from the division value converting circuit 422 is supplied to a vector quantization circuit 428 directly and through a delay (H) circuit 426 for delaying one horizontal scanning line (1H), i.e., a samples. The samples in the vertical direction are vector-quantized. The output from the division value converting circuit 422 is also supplied to a vector quantization circuit 432 directly and through a delay (D) circuit 430 for delaying one sample. The samples in the horizontal directions are vector-quantized. In this case, the vector quantization circuit 428 is operated for only odd-numbered i in the code $\Delta_{i,j}$, while the vector quantization circuit 432 is operated for only even-numbered j in the code $\Delta_{i,j}$. In this case, both a and b are even numbers.

The decision circuit 424 calculates differences between samples paired in the vertical and horizontal directions within each block and obtained by vector quantization in the vector quantization circuits 428 and 432. More specifically, the decision circuit 424 calculates horizontal and vertical maximum differences and determines which maximum difference is larger. An arrangement of the decision circuit 424 is shown in FIG. 15 under the conditions that a=b=4, i.e., one block consists of 4 samples×4 samples, and every two samples are vector-quantized. Referring to FIG. 15, the decision circuit 424 includes an input terminal 450, a 1H (four samples) delay circuit 451, a 2H (8 samples) delay circuit 452, a 3H (12 samples) delay circuit 453, a 1D (one sample) delay circuit 454, a 2D (one sample) delay circuit 455, a 3D (one sample) delay circuit 456, subtracters 457, 458, 459, and 460, MAX value detection circuits 461 and 462, a subtracter 463, a MAX value decision circuit 464, and an output terminal 465 of a decision result (i.e., a signal representing a larger one of the horizontal and vertical maximum differences appears at the output terminal 465).

The MAX value detection circuit 461 extracts outputs from the subtracters 457 and 458 when i of the sample data $D_{i,j}$ (i=1 to 4 and j=1 to 4) is 4. The MAX value detection circuit 462 extracts outputs from the subtracters 459 and 460 if j=4. The MAX value detection circuits 461 and 462 generate outputs in units of blocks. The MAX value decision circuit 464 outputs a binary signal representing the decision result in units of blocks.

Figure 16A:
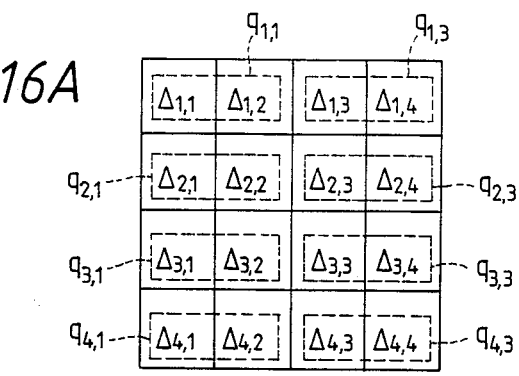
Figure 16B:
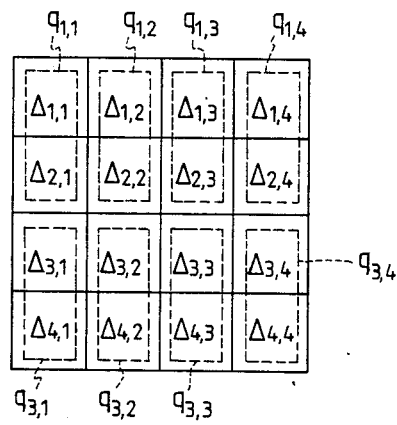

A selection switch 434 is switched in response to a direction signal output from the decision circuit 424. That is, of an h-bit (h<2k) output from the vector quantization circuits 428 and 432, the selection switch 434 selects and outputs data representing a smaller maximum difference. FIGS. 16A and 16B show combinations in vector quantization for every two samples in a block consisting of 16 (i.e., a=4 and b=4) sample points. More specifically, FIG. 16A shows a case in the horizontal direction, and FIG. 16B shows a case in the vertical direction. This selected information is supplied to a timing control circuit 448 and is transmitted to a reception system in an order of maximum and minimum data.

Figure 17A:
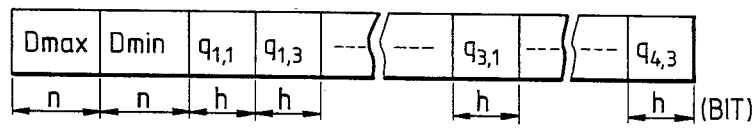
Figure 17B:
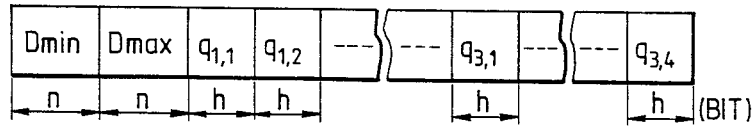

The h-bit (h<2k) vector-quantized data $q_{i,j}$ (j=1, 3 in horizontal combinations; and i=1, 3 in vertical combinations) output from the selection circuit 434 is supplied to a parallel/serial (P/S) conversion circuit 438 and is output as serial data at a predetermined timing. The output Dmax (n bits) from the MAX value detection circuit 414 is supplied to a P/S conversion circuit 440. The output Dmin (n bits) from the MIN value detection circuit 416 is supplied to a P/S conversion circuit 442. Outputs from the P/S conversion circuits 438, 440, and 442 are selectively switched by a selection switch 444, and the selected output becomes serial data shown in FIG. 17A or 7B. FIG. 17A shows a case in which horizontal samples are combined in vector quantization, and FIG. 17B shows a case in which vertical samples are combined in vector quantization. An order of transmission of maximum and minimum values in FIG. 17A is different from that in FIG. 17B. The transmission order represents a direction of selection in vector quantization.

Referring to FIG. 12, the serial data from the selection switch 444 is converted into data having a predetermined bit rate by a FIFO (First-In First-Out) buffer 445. The resultant data is supplied to a synchronization adding circuit 446. The synchronization adding circuit 446 adds a sync signal to the input data and outputs the resultant signal to an output terminal 447. The output terminal 447 is connected to an external device such as a VTR to output the transmission data to the external device. An addition of the sync signal in the synchronization adding circuit 446 is performed every block or every predetermined blocks.

Operation timings of the above circuits are systematically controlled by the timing control circuit 448.

Figure 18:
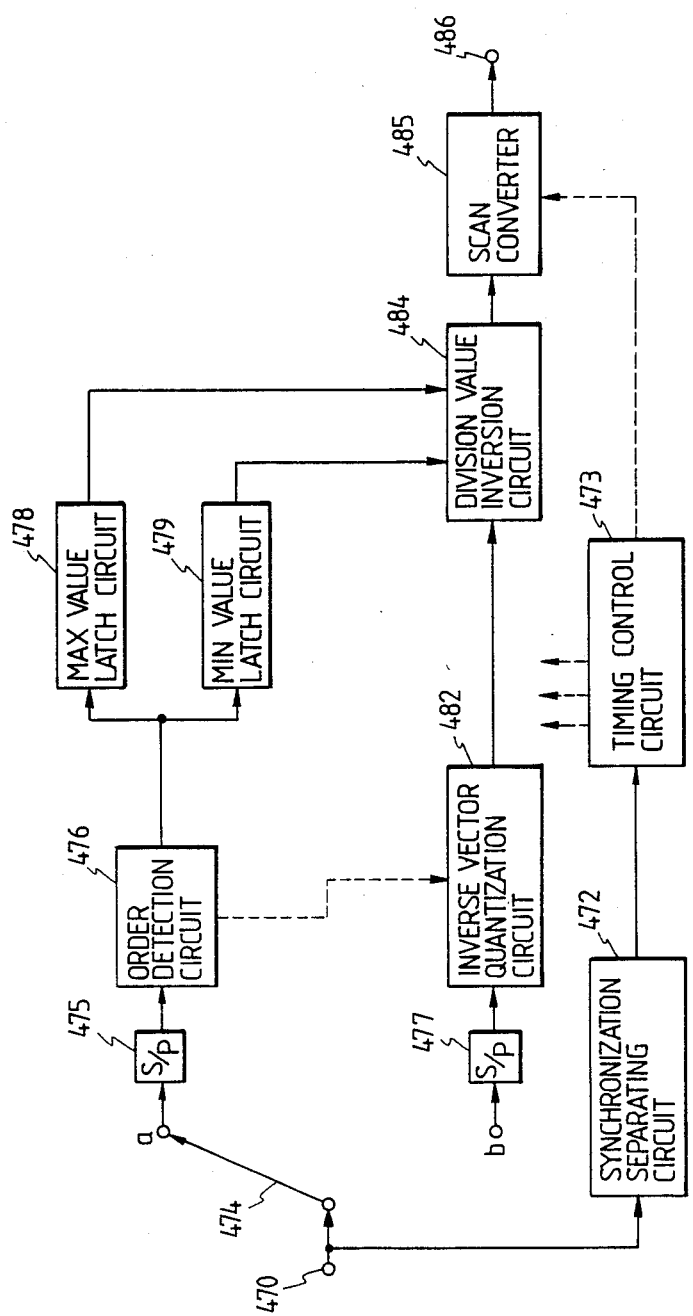
FIG. 18 is a block diagram showing a reception system corresponding to the transmission system in the image information signal transmission apparatus shown in FIG. 12.

FIG. 18 is a block diagram of a reception system corresponding to the transmission system shown in FIG. 12. The transmission data which is highly efficiently coded by the system shown in FIG. 12 is input to an input terminal 470. A synchronization separating circuit 472 separates from the transmission data the sync signal added by the synchronization adding circuit 446 of FIG. 12. The separated sync signal is supplied to a timing control circuit 473. The timing control circuit 473 controls operation timings of the respective circuits in accordance with this sync signal. The maximum value data Dmax, the minimum value data Dmin, and the division code $q_{i,j}$ input from the input terminal 470 are distributed by a selection switch 474 and are converted into parallel data by S/P conversion circuits 475 and 477. The maximum and minimum value data Dmax and Dmin output from the S/P conversion circuit 475 are latched by MAX and MIN value latch circuits 478 and 479 through a MAX/MIN order detection circuit 476. The MAX/MIN order detection circuit 476 detects a transmission order of the maximum and minimum value data Dmax and Dmin. The vector-quantized code $q_{i,j}$ output from the S/P conversion circuit 477 is supplied to an inverse vector quantization circuit 482. The inverse vector quantization circuit 482 performs inverse vector quantization with reference to the transmission order information from the MAX/MIN value order detection circuit 476 and outputs division data corresponding to the sample data.

A division value inversion circuit 484 decodes the sample data by the division data output from the inverse vector quantization circuit 482 with reference to the maximum and minimum value data Dmax and Dmin respectively latched by the MAX and MIN value latch circuits 478 and 479. Since the sample data are output from the division value inversion circuit 484 in units of blocks, the output order is converted by a scan converter 485 into an order corresponding to raster scan. Therefore, the sample data corresponding to the normal raster scan appear at an output terminal 486.

Figure 19:
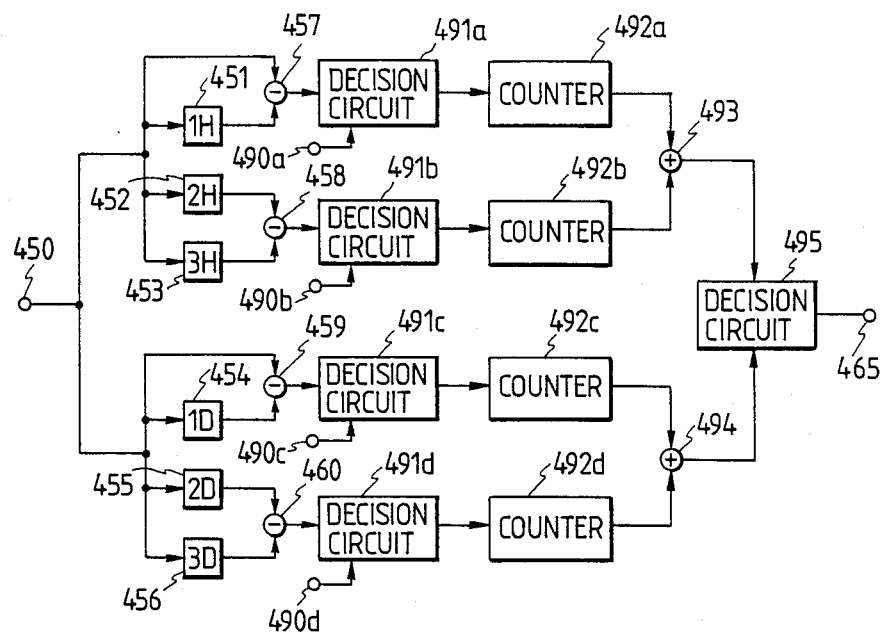
FIG. 19 is a block diagram showing a modification of the decision circuit shown in FIG. 12.

FIG. 19 is a view showing a modification of a decision circuit 424 in FIG. 12. In this case, assume that every two samples in a block consisting of 4 samples×4 samples are vector-quantized. The same reference numerals as in FIG. 15 denote the same parts in FIG. 19. In the arrangement of FIG. 19, in place of the MAX value detection circuits 461 and 462, outputs from subtracters 457 to 460 are compared with a predetermined threshold value. The number of data larger than the threshold value is counted by a counter. Input terminals 490a, 490b, 490c and 490d receive the threshold value. Decision circuits 491a 491b, 491c, and 491d compare the input data with the threshold value and output pulses subjected to counting when the data are larger than the threshold value. The pulses output from the decision circuits 491a, 491b, 491c, and 491d are counted by counters 492a, 492b, 492c, and 492d, respectively. An adder 493 adds outputs from the counters 492a and 492b, and an adder 494 adds outputs from the counters 492c and 492d. A decision circuit 495 decides a smaller one of the outputs from the adders 493 and 494. In the arrangement of FIG. 19, the decision circuits 491a and 491b are operated for i=4, and the decision circuits 491c and 491d are operated for j=4. The decision circuit 495 outputs a binary signal in units of blocks.

As described above, since the direction of vector quantization is adaptively selected in accordance with a change in image in the third embodiment, the image information signal can be compressed at a high compression ratio without degrading the information signal and can be transmitted.

A fourth embodiment according to the present invention will be described with reference to the accompanying drawings.

In general, frames of the television signal have high correlation. Information representing that an image has changed need not be added to all sample data or sample data groups. This information can be omitted, so that the volume of transmission data can be reduced. The fourth embodiment is made based on the above phenomenon.

Figure 20:
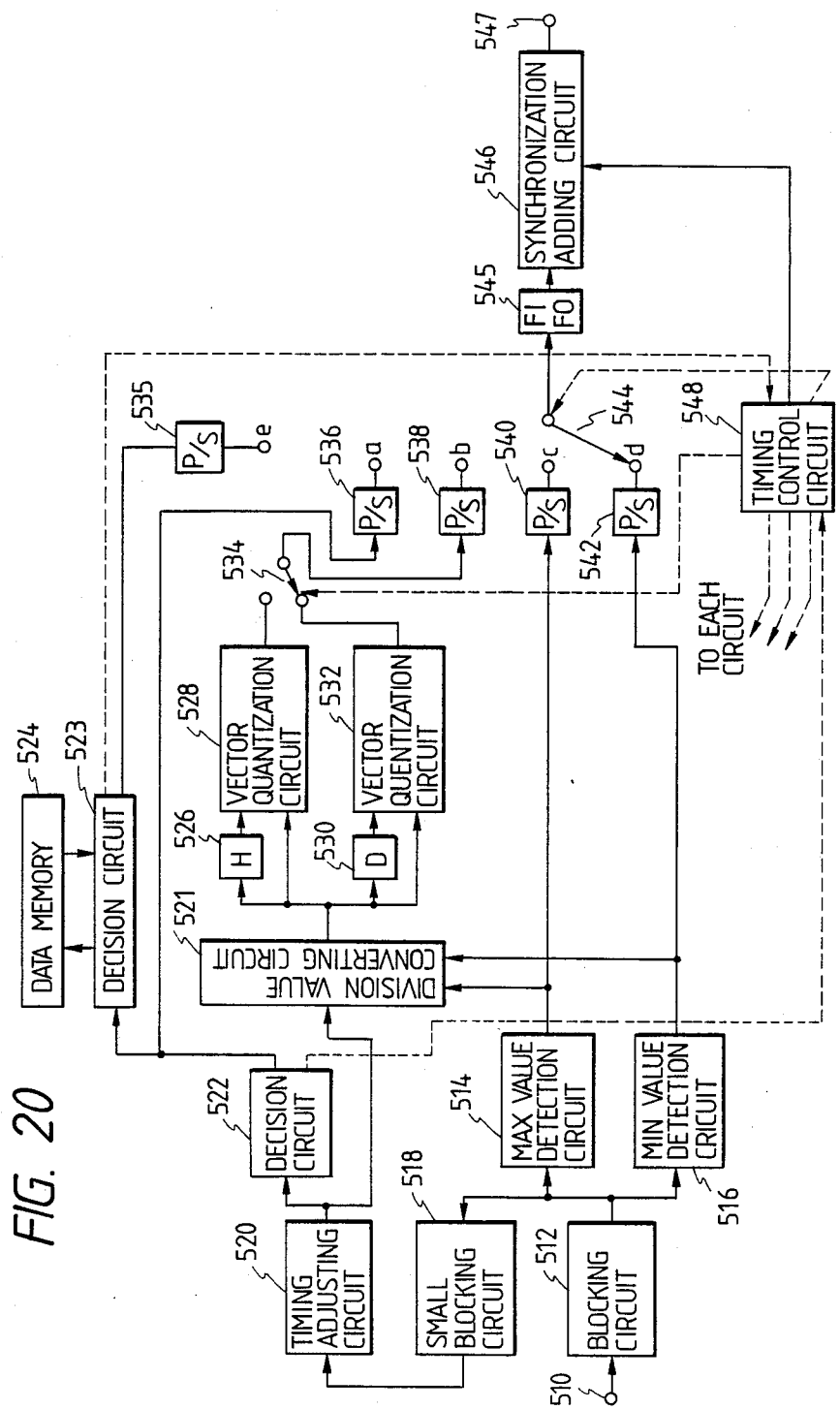
FIG. 20 is a block diagram showing an arrangement of a transmission system in an image information signal transmission apparatus according to a fourth embodiment of the present invention.

FIG. 20 is a block diagram of a transmission system in an image information signal transmission apparatus according to a fourth embodiment of the present invention. An input terminal 510 receives n-bit sample data (i.e., digital image data having $2^n$ gradation levels). The input sample data is obtained such that a raster-scanned analog image signal such as a television signal is sampled at a predetermined frequency (e.g., $4f_{SC}$), and the sample data is linearly quantized. A blocking circuit 512 converts the sample data input from the input terminal 510 into block data having a sample points in the vertical direction and b sample points in the horizontal direction. Each block includes a×b sample points. In the following description, sample data in each block is generally represented by $D_{i,j}$ (i=1 to a and j=1 to b), as shown in FIG. 14.

Sample block data output from the blocking circuit 512 is supplied to a MAX value detection circuit 514, a MIN value detection circuit 516, and a small blocking circuit 518. The MAX value detection circuit 514 detects a maximum value Dmax of all the sample data in units of blocks. The MIN value detection circuit 516 detects a minimum value Dmin. The small blocking circuit 518 divides one block into small blocks each including x sample points in the vertical direction and y sample points in the horizontal direction and outputs sample data of small blocks in a predetermined order.

Figure 21:
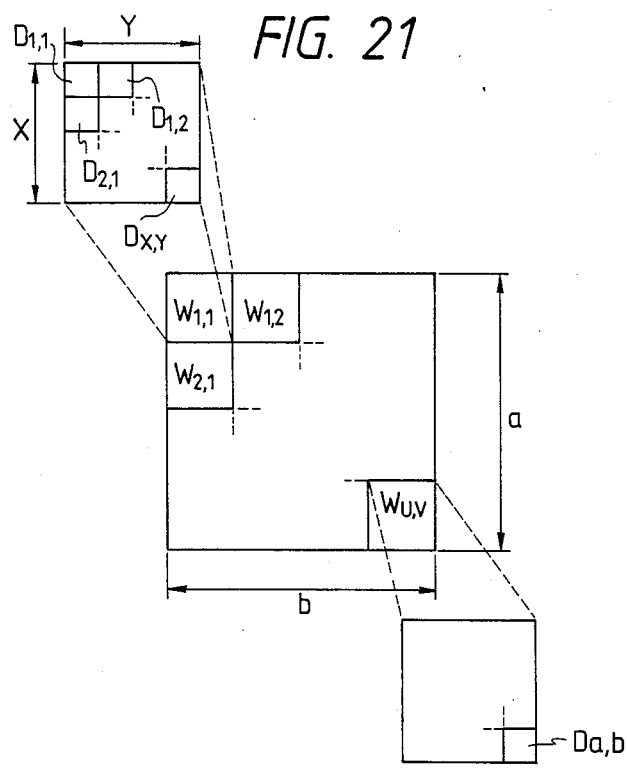
FIG. 21 is a view showing a state in which a block of sample points on the screen is divided into small blocks.

A timing adjusting circuit 520 adjusts timings of the MAX and MIN value detection circuits 514 and 516 and delays an output from the small blocking circuit 518 by a delay time corresponding to the detection processing time of the circuits 514 and 516. The sample data delayed by the timing adjusting circuit 520 is supplied to a division value converting circuit 521 and a decision circuit 522. For example, the sample data in each block are supplied in an order of $D_{1,1}, D_{2,1}, \ldots D_{x,1}, D_{1,2}, \ldots D_{x,y}, \ldots D_{a,b}$, as shown in FIG. 21. The division value converting circuit 521 also receives the maximum and minimum values Dmax and Dmin respectively detected by the MAX and MIN value detection circuits 514 and 516. The division value converting circuit 521 compares each sample data $D_{i,j}$ with quantization levels obtained by dividing a different between the maximum and minimum values Dmax and Dmin by $2^k$ and outputs a k-bit division code $\Delta_{i,j}$ ($\Delta_{1,1}$ to $\Delta_{a,b}$).

An output from the division value converting circuit 521 is further vector-quantized. More specifically, the output from the division value converting circuit 521 is supplied to a vector quantization circuit 58 directly and through a one-horizontal scanning line (1H) (i.e., a samples) delay circuit 526. The samples in the vertical direction are vector-quantized. The output from the division value converting circuit 521 is supplied to a vector quantization circuit 532 directly and through a one-sample (D) delay circuit 530. Samples in the horizontal direction are vector-quantized. The vector quantization circuit 528 is operated only when i of $\Delta_{i,j}$ is an even number, while the vector quantization circuit 532 is operated only when j is an even number. Both a and b are even numbers. The vector quantization circuit 532 changes an output order so as to output the quantized data in units of small blocks (to be described later).

Figure 22:
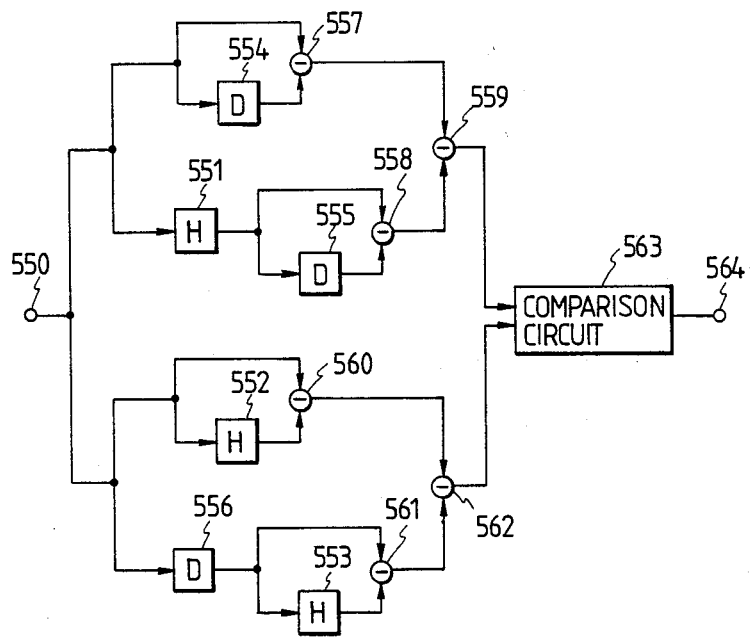
FIG. 22 is a block diagram showing an arrangement of a decision circuit shown in FIG. 20.

The decision circuit 522 calculates differences between samples paired in the vertical and horizontal directions in vector quantization by the vector quantization circuits 528 and 532. More specifically, the decision circuit 522 calculates horizontal and vertical maximum differences and decides a larger one of the maximum differences. An arrangement of the decision circuit for a small block of 2 samples×2 samples is shown in FIG. 22. This decision circuit includes an input terminal 550, 1H delay circuits 551, 52, and 553, 1D (one sample)

delay circuits 554, 555, and 556, subtracters 557, 558, 559, 560, 561, and 562, a comparison circuit 563, and an output terminal 564 at which a decision result representing a larger one of the horizontal and vertical maximum differences appears. More specifically, the comparison circuit 563 is operated only when both i and j in the sample data $D_{i,j}$ are even numbers and outputs a binary signal representing the decision result representing a larger one of the horizontal and vertical maximum values in units of small blocks.

Figure 23:
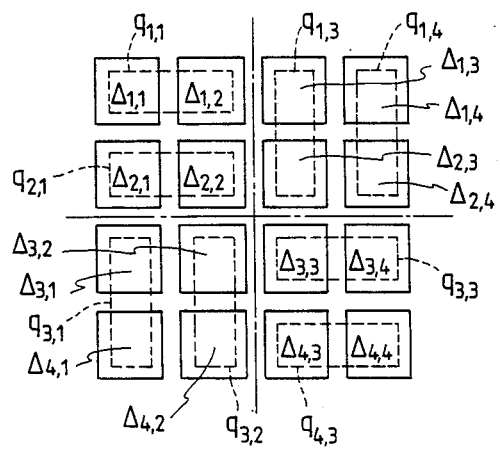
FIG. 23 is a view showing a combination of sample points in vector quantization of every two samples when the block consisting of 16 sample points is divided into small blocks each having four sample points.

The binary signal output from the decision circuit 22 controls switching of a selection switch 534 through a timing control circuit 548. Of the h-bit (h<2k) output from the vector quantization circuits 528 and 532, the selection switch 534 selects and outputs data having a smaller maximum difference. FIG. 23 shows vector quantization wherein a block consisting of 16 sample points (a=4 and b=4) is divided into small blocks each having four sample points, and every two samples are vector-quantized. FIG. 23 shows vector quantization in which any of differences between $\Delta_{1,1}$ and $\Delta_{2,1}$ and between $\Delta_{1,2}$ and $\Delta_{2,2}$ are larger than differences between $\Delta_{1,1}$ and $\Delta_{1,2}$ and between $\Delta_{2,1}$ and $\Delta_{2,2}$, and horizontal combinations of $\Delta_{1,1}$ and $\Delta_{1,2}$, and $\Delta_{2,1}$ and $\Delta_{2,2}$ are selected for vector quantization when a small block consists of $\Delta_{1,1}$, $\Delta_{2,1}$, $\Delta_{1,2}$, and $\Delta_{2,2}$.

The vector quantization circuit 528 outputs vector-quantized data $q_{1,1}$, $q_{1,2}$, $q_{1,3}$, and $q_{1,4}$ in accordance with the inputs $\Delta_{3,1}$, $\Delta_{2,2}$, $\Delta_{2,3}$, and $\Delta_{2,4}$ in the order named. The vector quantization circuit 532 forms vector-quantized data $q_{1,1}$, $q_{1,3}$, $q_{2,1}$, and $q_{2,3}$ in response to the outputs $\Delta_{1,2}$, $\Delta_{1,4}$, $\Delta_{2,2}$, and $\Delta_{2,4}$ in the order named. However, an output order is given as $q_{1,1}$, $q_{2,1}$, $q_{1,3}$, and $q_{2,3}$ in accordance with an order of small blocks. Output timings of the vector-quantized data $q_{1,1}$ from the vector quantization circuits 528 and 532 coincide with each other. Therefore, the vector-quantized data in units of small blocks are output.

The information representing the decision result is required at a reception system or at the time of image decoding and is output onto a transmission line through a parallel/serial (P/S) conversion circuit 536. The decision result information is represented by one bit per small block ($W_{1,1}$, $W_{2,1}$, ... $W_{i,j}$, ... $W_{u,v}$ in FIG. 21). U=V 2 in the above embodiment.

The binary signal output from the decision circuit 522 is also supplied to a decision circuit 523. The decision circuit 523 compares the decision result of the current frame with the corresponding decision result of the immediately preceding frame at identical positions of identical small blocks and outputs a one-bit signal f representing whether a change in decision result of at least one small block of the block is present. The decision result information stored in a data memory 524 is updated in units of small blocks when the decision result is changed. When the sample data corresponding to the first frame are supplied, all pieces of the decision result information of all small blocks are directly stored in the data memory 524.

Figure 24A:
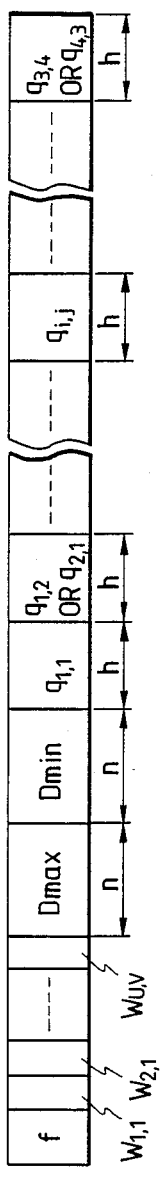
Figure 24B:
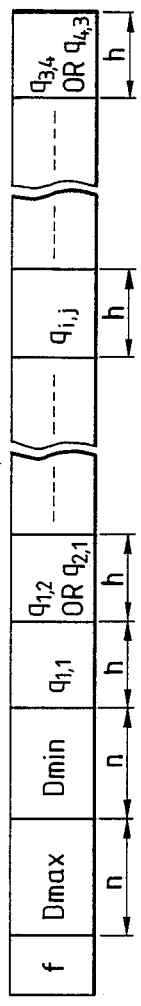

The vector-quantized h-bit (h<2k) data $q_{i,j}$ (i=1, 3 for the outputs from the vector quantization circuit 528; j=1, 3 for the outputs from the vector quantization circuit 532) output from the selection switch 534 is supplied to a P/S conversion circuit 538 and output as serial data at a predetermined timing. The output Dmax (n bits) from the MAX value detection circuit 514 is supplied to a P/S conversion circuit 540. The output Dmin from the MIN value detection circuit 516 is supplied to a P/S conversion circuit 542. Selected information $W_{i,j}$ (the number of small blocks in a 1 bit×1 block) representing a direction of vector quantization and decided in units of small blocks is supplied to a P/S conversion circuit 536. The selected information presence/absence signal f output from the decision circuit 523 is supplied to a P/S conversion circuit 535. Outputs from the P/S conversion circuits 535, 536, 538, 540, and 542 are selectively output by a selection switch 544 as serial data shown in FIG. 24A or 24B. FIG. 24A shows a case wherein a change occurs in a direction of selection in the first frame of the image sample data transmission processing or at least one small block for the same block as that of the immediately preceding frame. FIG. 24B shows a case in which no change occurs in any small block.

Referring to FIG. 20, the serial data from the selection switch 544 is converted into data having a predetermined bit rate by a FIFO (First-In First-Out) buffer 545, and is then supplied to a synchronization adding circuit 546. The synchronization adding circuit 546 adds a sync signal to the data, and outputs transmission data to an output terminal 547. An addition of the sync signal in the synchronization adding circuit 546 is performed every block or every predetermined blocks. An external device such as a VTR is connected to the output terminal 547, and the transmission data is output to the external device.

Operation timings of the above circuits are systematically controlled by a timing control circuit 548.

Figure 25:
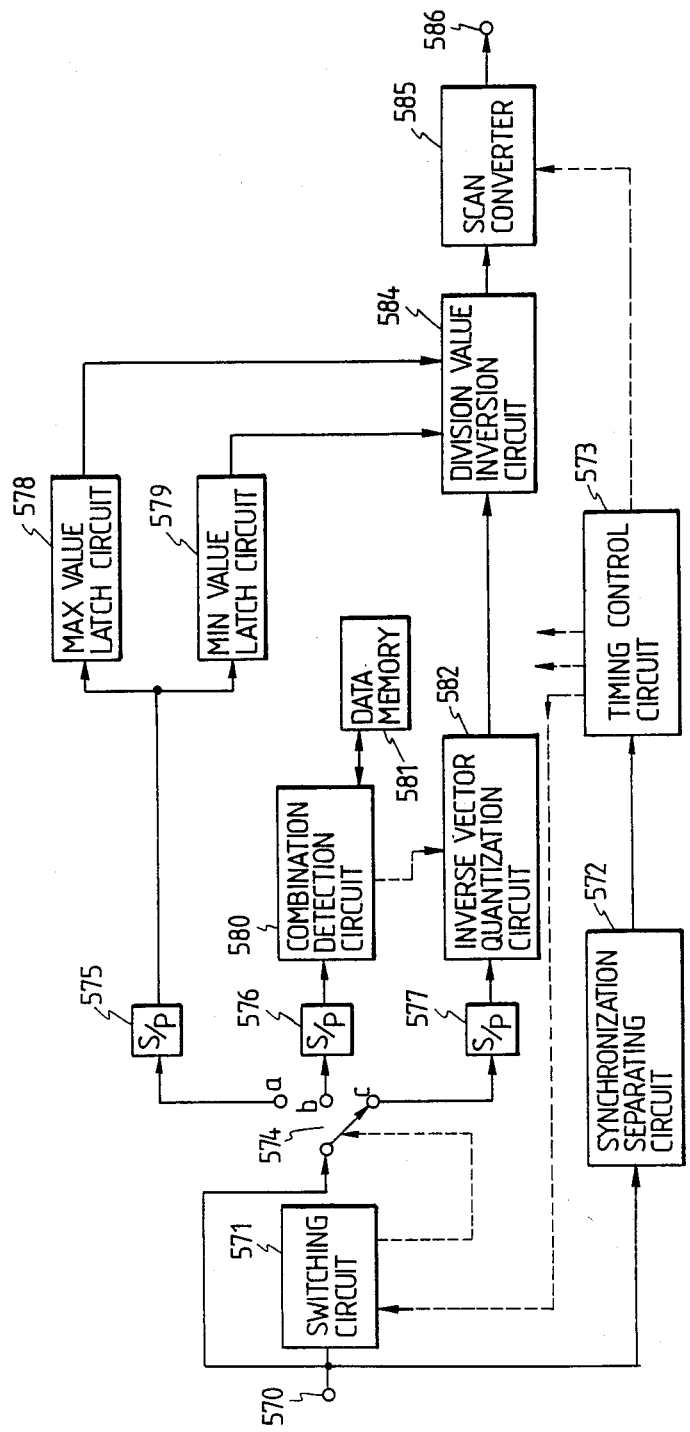
FIG. 25 is a block diagram showing a reception system corresponding to the transmission system in the image information signal transmission apparatus shown in FIG. 20.

FIG. 25 is a block diagram of a reception system corresponding to the transmission system shown in FIG. 20. The transmission data which is highly efficiently coded by the system shown in FIG. 20 is input to an input terminal 570. A switching circuit 571 controls a switching operation of a switch 574 in accordance with the information signal f representing the presence/absence of selected information W of the direction of vector quantization. A synchronization separating circuit 572 separates the sync signal added by the synchronization adding circuit 546 (FIG. 20). A timing control circuit 573 controls the operation timings of the following circuits in accordance with the sync signal separated by the synchronization separating circuit 572, and the switching circuit 571 controls the switching operation of the switch 574 in accordance with the information signal f representing the presence/absence of the selected information and the selected information W of the direction of vector quantization. When a change in direction selection occurs, the received transmission data is selectively switched into the n-bit maximum and minimum value data Dmax and Dmin, the h-bit vector-quantized data $q_{i,j}$, and the selected information $W_{i,j}$ of the direction of vector quantization by contacts a, b, and c of the switch 574. However, when no change in direction selection occurs, the data Dmax and Dmin and the vector-quantized data $q_{i,j}$ are switched by the contacts a and c of the switch 574. The selectively switched data are converted into parallel data by S/P conversion circuits 575, 576, and 577.

The maximum and minimum value data Dmax and Dmin output from the S/P conversion circuit 575 are latched by MAX and MIN value latch circuits 578 and 579, respectively. The selected information W of the direction of vector quantization output from the S/P conversion circuit 576 is supplied to a combination detection circuit 580. When no change in direction decision result occurs, the combination detection circuit 580 reads out the decision result of the immediately preceding frame stored in a data memory 581. The readout data is supplied to an inverse vector quantization circuit 582. Otherwise, the decision result of the current frame in the data memory 581 is updated by data representing the selected information W from the S/P conversion circuit 576. At the same time, the selected information W is supplied to the inverse vector quantization circuit 582. The vector-quantized data $q_{i,j}$ output from the S/P conversion circuit 577 is supplied to the inverse vector quantization circuit 582. The inverse vector quantization circuit 582 performs inverse vector quantization by referring to the data representing the selected information of the direction of vector quantization. The inverse vector quantization circuit 582 outputs division data corresponding to each sample data.

A division value inversion circuit 584 decodes the sample data by the division data output from the inverse vector quantization circuit 582 with reference to the maximum and minimum value data Dmax and Dmin respectively output from the MAX and MIN value latch circuits 578 and 579. The sample data are output from the division value inversion circuit 584 in units of blocks. A scan converter 585 converts the output order into an order corresponding to raster scan. Therefore, the sample data corresponding to the normal raster scan appears at an output terminal 586.

Figure 27A:
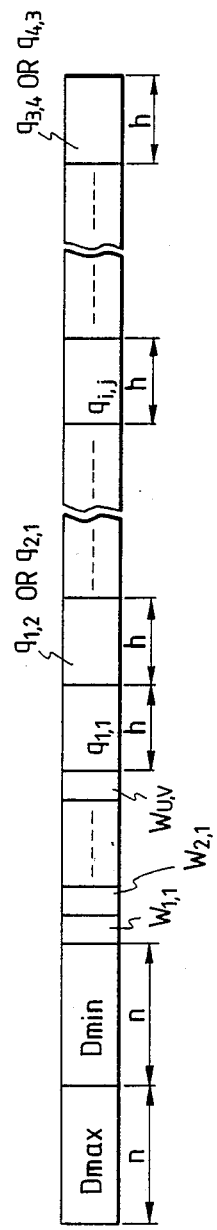
FIGS. 27A, 27B are view showing a format of a transmission data series formed by the transmission system in the image information signal transmission apparatus shown in FIG. 26.
Figure 27B:
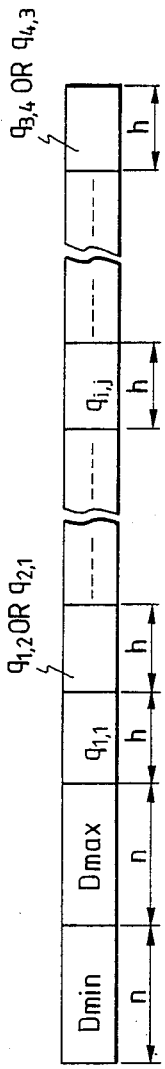
Figure 26:
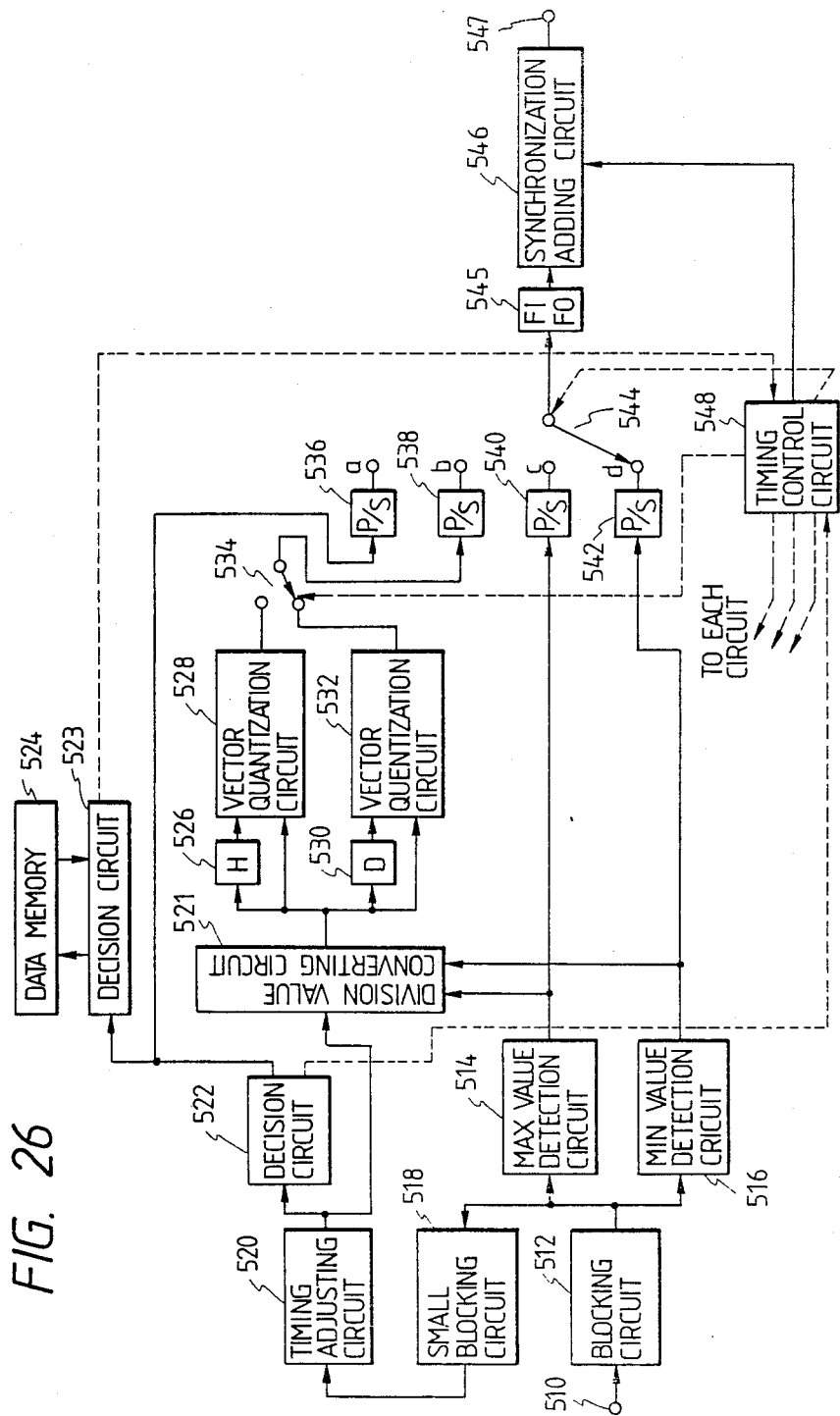
FIG. 26 is a block diagram showing an arrangement of a transmission system in an image information signal transmission apparatus according to a modification of the fourth embodiment shown in FIG. 20.

FIG. 26 is a block diagram showing a modification of the transmission system (FIG. 20) in the image information signal transmission apparatus according to the fourth embodiment of the present invention. In the modification shown in FIG. 26, without transmitting the information signal f representing the presence/absence of the selected information output from the decision circuit 523 shown in FIG. 20, the presence/absence of the selected information is acknowledged to the reception side by a transmission order of the maximum and minimum value data Dmax and Dmin of the transmission data. More specifically, a timing control circuit 548 controls a selection order of P/S conversion circuits 540 and 542 in accordance with an output from the decision circuit 523. Other arrangements in FIG. 26 are the same as those in FIG. 20. According to this modification, the information volume of the transmission data can be reduced by one bit/block. A format of the information data output from the system shown in FIG. 26 is shown in FIGS. 27A and 27B.

Figure 28:
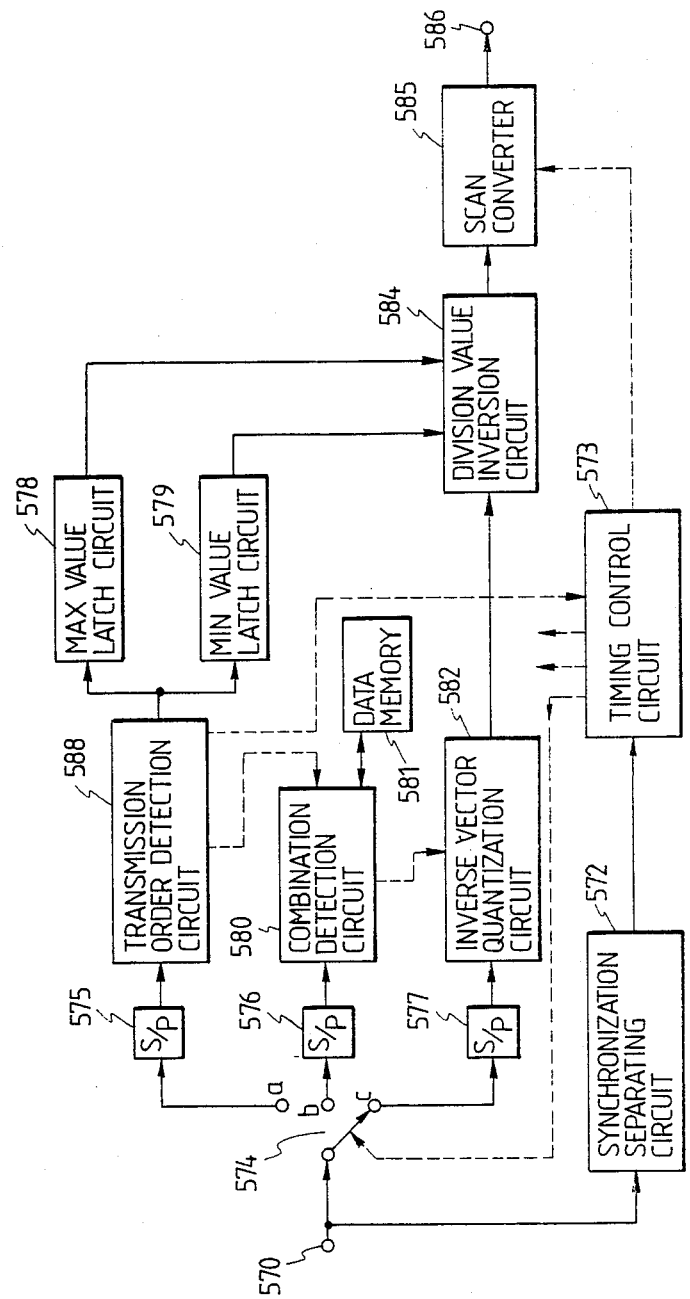
FIG. 28 is a block diagram showing an arrangement of a reception system corresponding to the transmission system in the image information signal transmission apparatus shown in FIG. 26.

FIG. 28 is a block diagram of a transmission system in the image information signal transmission apparatus corresponding to FIG. 26. In the arrangement of FIG. 28, in place of the switching circuit 571 in FIG. 20, a transmission order detection circuit 588 is arranged between an S/P conversion circuit 575 and MAX and MIN value latch circuits 578 and 579 to detect a transmission order of the maximum and minimum value data Dmax and Dmin. A detection result from the detection circuit 588 is supplied to a combination detection circuit 580 and a timing control circuit 573 to control the combination detection circuit 580 and a switch 574. Other operations in FIG. 28 are the same as those in FIG. 25.

As described above, the fourth embodiment is arranged to adaptively select the direction of vector quantization in accordance with a change in image. Therefore, the image information signal can be compressed at a high compression ratio without degrading the image information signal and can be transmitted.

A fifth embodiment of the present invention will be described with reference to the accompanying drawings.

Figure 29:
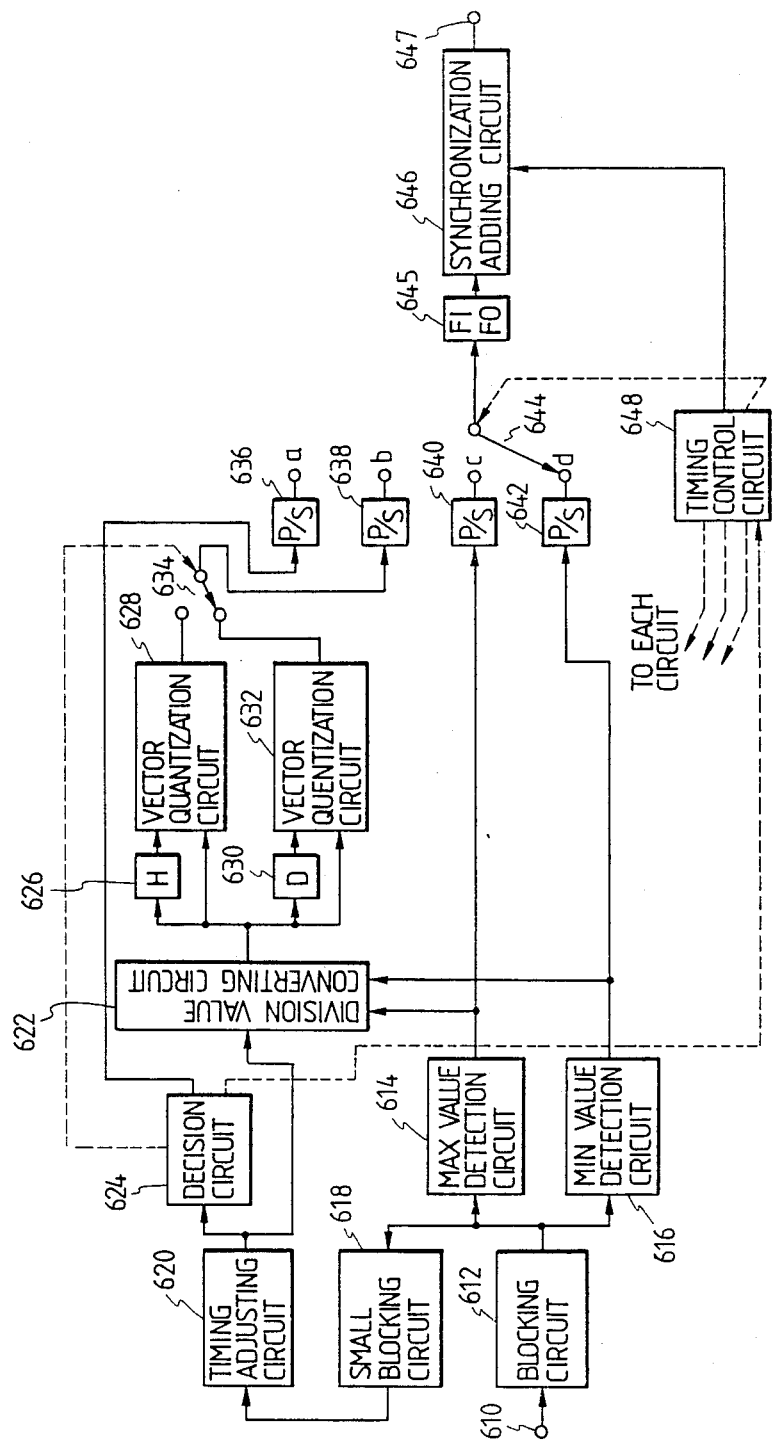
FIG. 29 is a block diagram showing an arrangement of a transmission system in an image information signal transmission apparatus according a fifth embodiment of the present invention.

FIG. 29 is a block diagram of a transmission system in an image information signal transmission apparatus according to a fifth embodiment of the present invention. An input terminal 610 receives n-bit sample data (i.e., digital image data having $2^n$ gradation levels). The input sample data is obtained such that a raster-scanned analog image signal such as an analog image signal is sampled at a predetermined frequency (e.g., $4f_{SC}$) and the sampled data is quantized. A blocking circuit 612 converts the sample data input from the input terminal 610 into block data having a sample points in the vertical direction and b sample points in the horizontal direction, as shown in FIG. 13. Each block divides one frame into a plurality of blocks. In the following description, sample data in each block is generally represented by $D_{i,j}$ (i=1 to a and j=1 to b), as shown in FIG. 14.

Sample block data output from the blocking circuit 612 is supplied to a MAX value detection circuit 614, a MIN value detection circuit 616, and a small blocking circuit 618. The MAX value detection circuit 614 detects a maximum value Dmax of all the sample data in units of blocks. The MIN value detection circuit 616 detects a minimum value Dmin. The small blocking circuit 618 divides one block into small blocks each including x sample points in the vertical direction and sample points in the horizontal direction and outputs sample data of small blocks in a predetermined order.

A timing adjusting circuit 620 adjusts timings of the MAX and MIN value detection circuits 614 and 616 and delays an output from the small blocking circuit 618 by a delay time corresponding to the detection processing time of the circuits 614 and 616. The sample data delayed by the timing adjusting circuit 620 is supplied to a division value converting circuit 622 and a decision circuit 624. The division value converting circuit 622 also receives the maximum and minimum values Dmax and Dmin respectively detected by the MAX and MIN value detection circuits 614 and 616. The division value converting circuit 622 compares each sample data $D_{i,j}$ with quantization levels obtained by dividing a different between the maximum and minimum values Dmax and Dmin by $2^k$ and output k-bit division codes $\Delta_{1,1}$ to $\Delta_{a,b}$.

An output from the division value converting circuit 622 is further vector-quantized. More specifically, the output from the division value converting circuit 622 is supplied to a vector quantization circuit 628 directly and through a one-horizontal scanning line (1H) (i.e., a samples) delay circuit 626. The samples in the vertical direction are vector-quantized. The output from the division value converting circuit 622 is supplied to a vector quantization circuit 632 directly and through a one-sample (D) delay circuit 630. Samples in the horizontal direction are vector-quantized The decision circuit 624 calculates differences between samples paired in the vertical and horizontal directions in vector quantization by the vector quantization circuits 628 and 632. More specifically, the decision circuit 624 calculates horizontal and vertical maximum differences and decides a larger one of the maximum differences. The arrangement of the decision circuit 624 is the same as that of the decision circuit 522 of the fourth embodiment, and a detailed description thereof will be omitted.

A selection circuit 634 is switched in response to the binary signal output from the decision circuit 624. Of the h-bit (h<2k) output from the vector quantization circuits 628 and 632, the selection switch 634 selects and outputs data having a smaller maximum difference. FIG. 23 shows vector quantization wherein a block consisting of 16 sample points (a=4 and b=4) is divided into small blocks each having four sample points, and every two samples are vector-quantized, as previously described. As shown in FIG. 23, vector quantization is performed such that any of differences between $\Delta_{1,1}$ and $\Delta_{2,1}$ and between $\Delta_{1,2}$ and $\Delta_{2,2}$ are larger than differences between $\Delta_{1,1}$ and $\Delta_{1,2}$ and between $\Delta_{2,1}$ and $\Delta_{2,2}$, and horizontal combinations of $\Delta_{1,1}$ and $\Delta_{1,2}$, and $\Delta_{2,1}$ and $\Delta_{2,2}$ are selected for vector quantization when a small block consists of $\Delta_{1,1}$, $\Delta_{2,1}$, $\Delta_{1,2}$, and $\Delta_{2,2}$. The information representing the decision result is required at a reception system or at the time of image decoding and is output onto a transmission line through a parallel/serial (P/S) conversion circuit 636. The decision result information is represented by one bit per small block ($W_{1,1}$, $W_{2,1}$, ... $W_{i,j}$, ... $W_{u,v}$ in FIG. 21). $U=V=2$ in the above embodiment.

The vector-quantized h-bit (h<2k) data $q_{i,j}$ for the outputs from the vector quantization circuit 632 output from the selection switch 634 is supplied to a P/S conversion circuit 638 and output as serial data at a predetermined timing. The output Dmax (n bits) from the MAX value detection circuit 614 is supplied to a P/S conversion circuit 640. The output Dmin from the MIN value detection circuit 616 is supplied to a P/S conversion circuit 642. Selected information $W_{i,j}$ (the number of small blocks in a 1 bit × 1 block) representing a direction of vector quantization and decided in units of small blocks is supplied to a P/S conversion circuit 636. Outputs from the P/S conversion circuits 635, 636, 638, 640, and 642 are selectively output by a selection switch 644 as serial data shown in FIG. 24A or 24B.

Referring to FIG. 29, the serial data from the selection switch 644 is converted into data having a predetermined bit rate by a FIFO (First-In First-Out) buffer 645, and is then supplied to a synchronization adding circuit 646. The synchronization adding circuit adds a sync signal to the data, and outputs transmission data to an output terminal 647. An addition of the sync signal in the synchronization adding circuit 646 is performed every block or every predetermined blocks.

Operation timings of the above circuits are systematically controlled by a timing control circuit 648.

Figure 30:
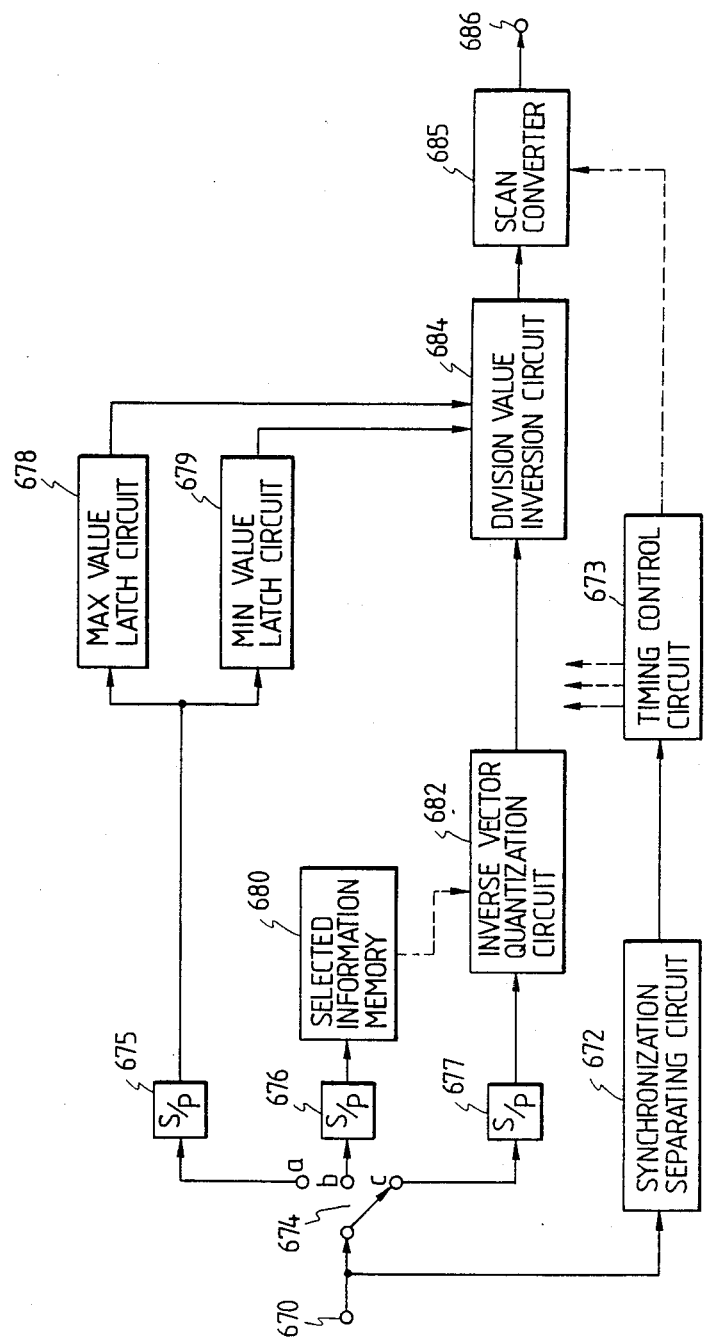
FIG. 30 is a block diagram showing an arrangement of a reception system corresponding to the transmission system in the image information signal transmission apparatus shown in FIG. 29.

FIG. 30 is a block diagram of a reception system corresponding to the transmission system shown in FIG. 29. The transmission data which is highly efficiently coded by the system shown in FIG. 29 is input to an input terminal 670. A synchronization separating circuit 672 separates the sync signal added by the synchronization adding circuit 646 (FIG. 29) and supplies the sync signal to a timing control circuit 673. The timing control circuit 673 controls the operation timings of the following circuits in accordance with the input sync signal. The maximum and minimum value data Dmax and Dmin and the selected information W of the direction of vector quantization which are input to the input terminal 670 and the h-bit vector-quantized data $q_{i,j}$ are distributed by a selection switch 674 and are converted into parallel data by S/P conversion circuits 675, 676, and 677. The maximum and minimum value data Dmax and Dmin output from the S/P conversion circuit 675 are latched by MAX and MIN value latch circuits 678 and 679, respectively. The selected information W of the direction of vector quantization output from the S/P conversion circuit 676 is temporarily stored in a selected information memory 680. The vector-quantized data $q_{i,j}$ output from the S/P conversion circuit 677 is supplied to an inverse vector quantization circuit 682. The inverse vector quantization circuit 682 refers to the selected information W stored in the selected information memory 680, performs inverse vector quantization, and outputs division data corresponding to each sample data.

A division value inversion circuit 684 refers to the maximum and minimum value data Dmax and Dmin latched by the MAX and MIN value latch circuits 678 and 679 and decodes the sample data by the division data output from the inverse vector quantization circuit 682. Outputs from the division value inversion circuit 684 appear in units of blocks. The output order is converted into an order corresponding to raster scan by a scan converter 685. Sample data corresponding to normal raster scan appears at an output terminal 686.

The number of bits of the transmission data will be described below. Assume that each block formed by the blocking circuit 612 has a size of 4 samples × 4 samples, and that each sample is expressed by 8 bits. Under these assumptions, one block requires an information volume of 128 (=8×16) bits. If the data Dmax and Dmin are 8-bit data, respectively, and k=4 is given, a total information volume for one block is given as 80 bits. In addition, if vector quantization of every two samples is performed to obtain 6-bit data, the information volume of the block can be compressed to a total of 64 bits. If a small block for selecting the horizontal or vertical vector quantization direction consists of 2 samples × 2 samples, the selected information W of the direction of vector quantization requires 4 bits. Only an information volume of 4 bits is increased in addition to 64 bits.

Figure 31:
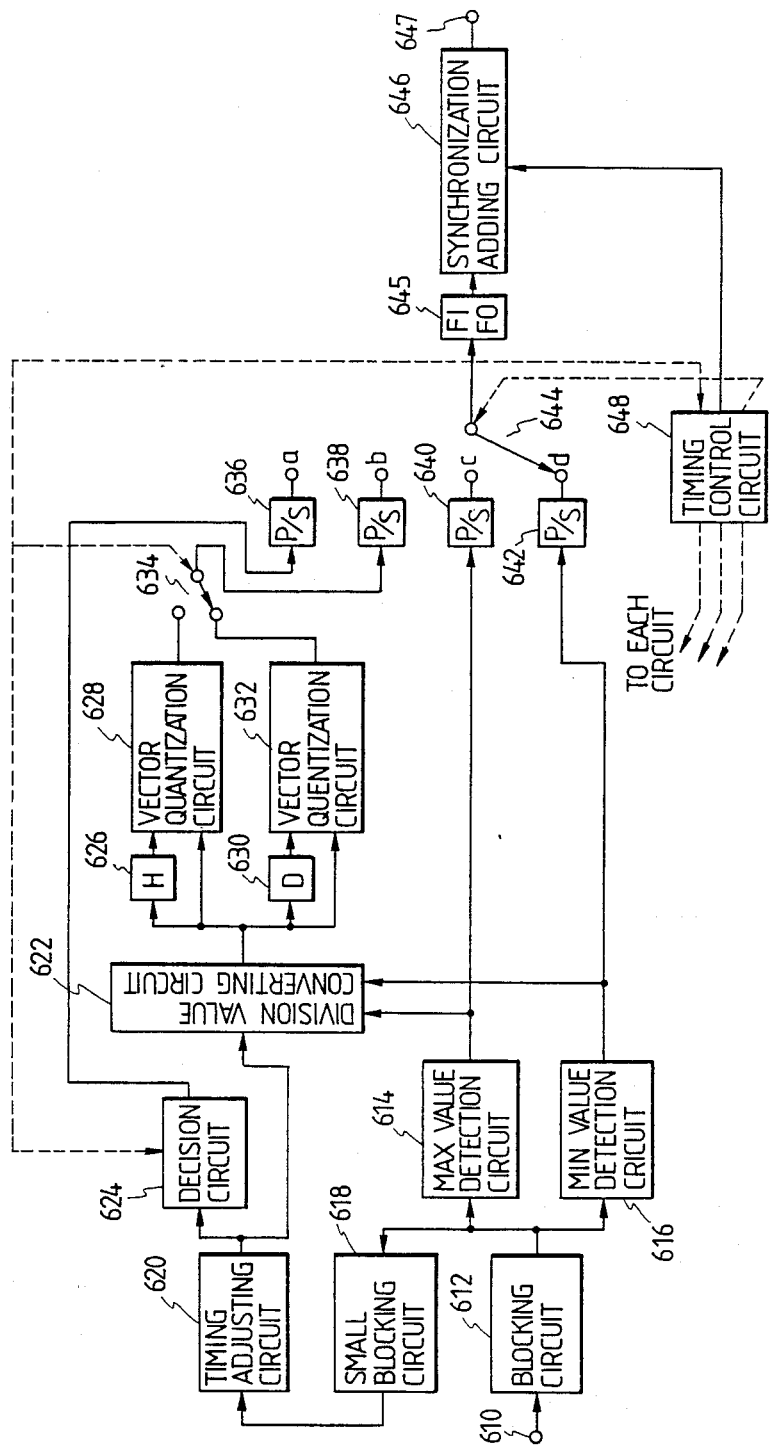
FIG. 31 is a block diagram showing an arrangement of a transmission system in an image information signal transmission apparatus according to a modification of the fifth embodiment shown in FIG. 29.
Figure 32:
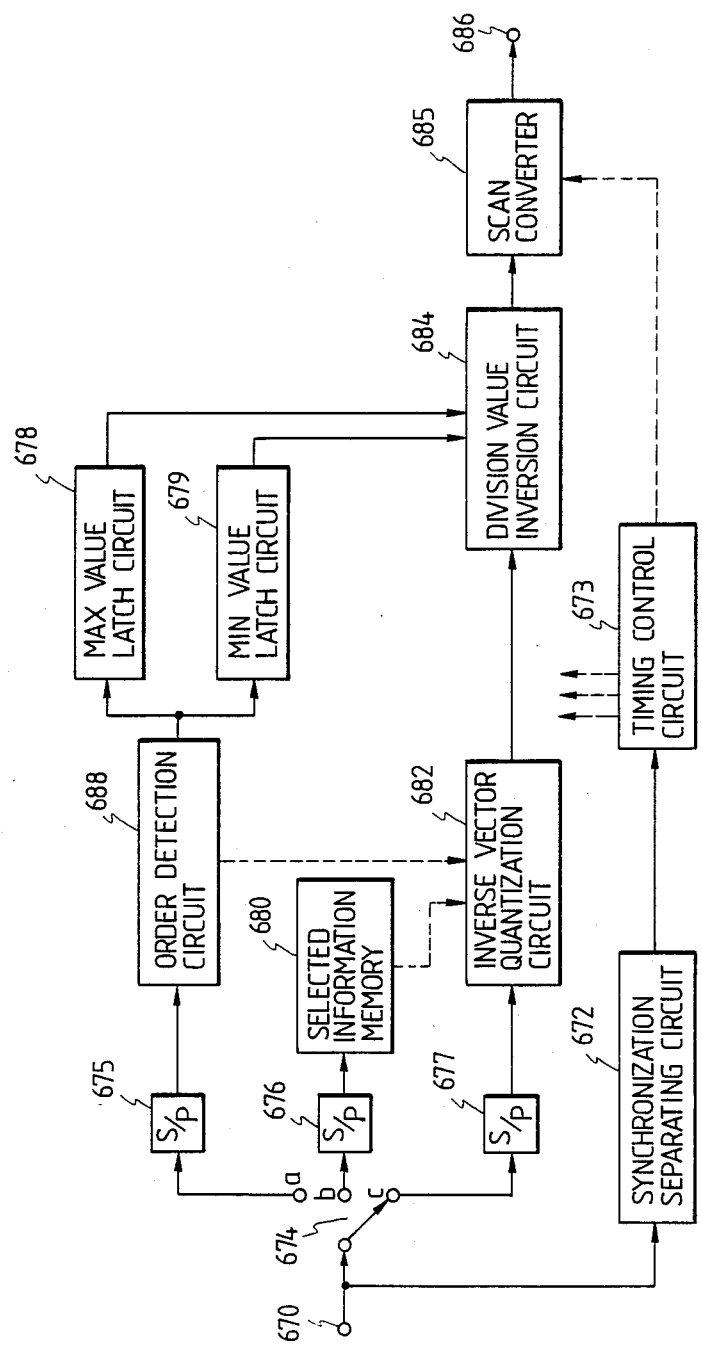
FIG. 32 is a block diagram showing an arrangement of a reception system corresponding to the transmission system in the image information signal transmission apparatus shown in FIG. 31.

In the above embodiment, the selected information W of the direction of inverse vector quantization is transmitted for all small blocks. However, the selected information W of one small block (e.g., the small block of each block to be transmitted first) of one block may be represented by a transmission order of the maximum and minimum values. FIG. 31 is a block diagram showing a modification of the transmission system in the image information signal transmission apparatus of the fifth embodiment shown in FIG. 29. The output (dotted line) from the decision circuit 624 in FIG. 29 is supplied to a timing control circuit 648 to change the connection order of a switch 644 to control the transmission order of the maximum and minimum value data Dmax and Dmin. In the arrangement shown in FIG. 31, the selected information W can be reduced by 1 bit/block. At the reception side, the direction of vector quantization of the small block (e.g., the first small block of each block to be transmitted) can be detected by detecting which one of the maximum and minimum value data Dmax and Dmin is transmitted first. In the reception system shown in FIG. 32, an order detection circuit 688 is connected to the output of the S/P conversion circuit 675 to detect the transmission order of the maximum and minimum value data Dmax and Dmin. A detection signal from the order detection circuit 688 is supplied to the inverse vector quantization circuit 682, and inverse vector quantization is performed.

The direction of vector quantization can be adaptively selected in accordance with a change in image. Therefore, the image information signal can be compressed at a high compression ratio without its degradation and can be transmitted.

A sixth embodiment of the present invention will be described with reference to the accompanying drawings. An image information signal used in this embodiment is obtained such that a television signal is sampled at a sampling frequency $4f_{SC}$ and the sample data is quantized to obtain 8-bit data.

Figure 33:
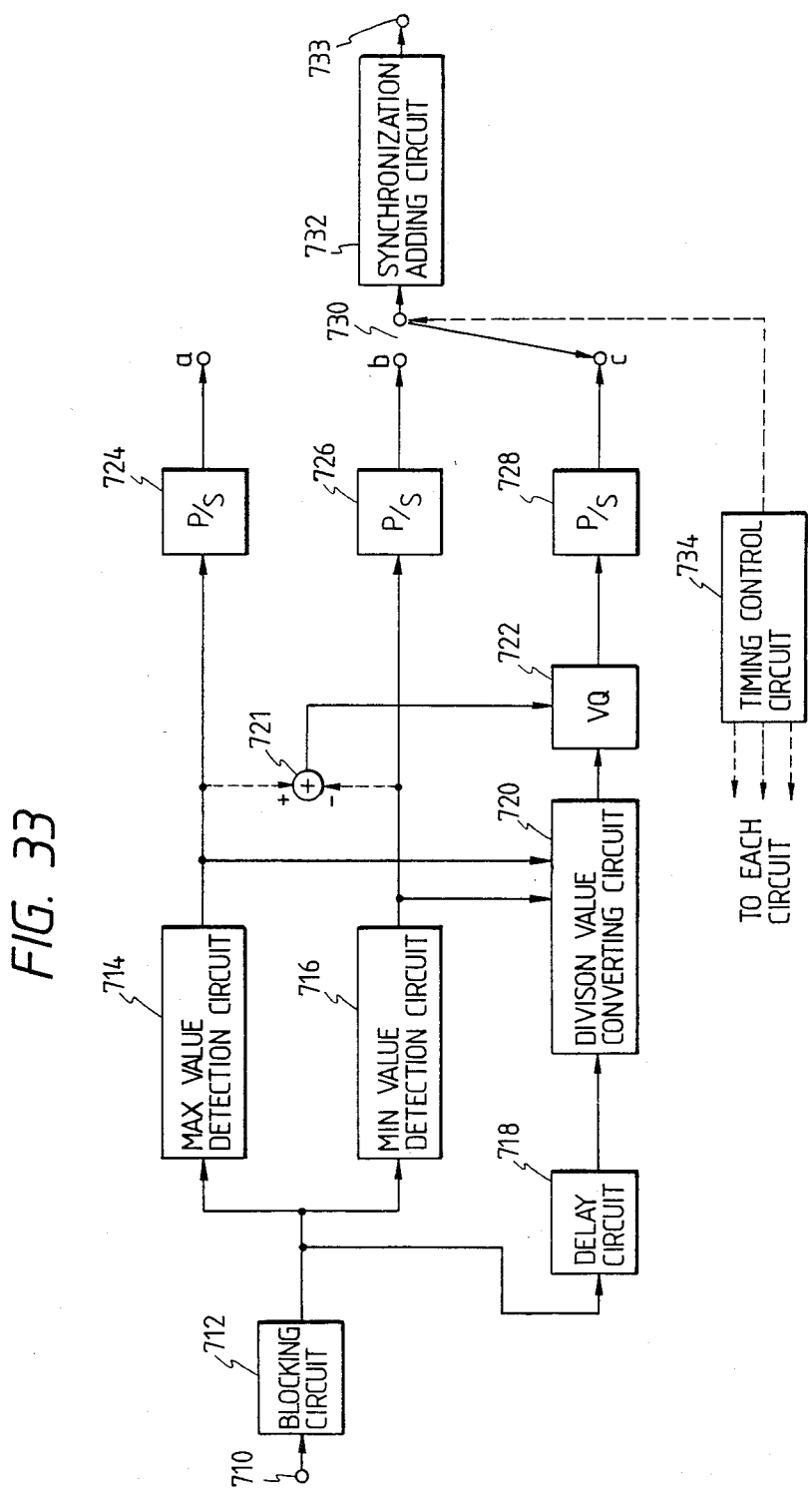
FIG. 33 is a block diagram showing an arrangement of a transmission system in an image information signal transmission apparatus according to a sixth embodiment of the present invention.

FIG. 33 is a block diagram showing an arrangement of a transmission system in an image information signal transmission apparatus according to the sixth embodiment of the present invention. Sample data are normally input to an input terminal 710 in an order of horizontal scanning lines. A blocking circuit 712 outputs sample data in units of blocks each having a predetermined number of samples. More specifically, as shown in FIG. 2, sample data input to the input terminal 710 in an order of ①, ②, ③, ④, ⑰, ⑱, ⑲, ... in the horizontal direction are converted by the blocking circuit 712 in an order of blocks, i.e., ①, ②, ③, ④, ⑤, ... ⑮, ⑯, and are output in an order of an intrablock horizontal direction. Of all sample data in each block, a MAX value detection circuit 714 detects sample data representing a maximum value. Of all sample data in each block, a MIN value detection circuit 716 detects sample data representing a minimum value. A delay circuit 718 delays an output from the blocking circuit 712 by a delay time corresponding to the detection processing times of the MAX and MIN value detection circuits 714 and 716. A division value converting circuit 720 divides a difference between the maximum value data output from the MAX value detection circuit 714 and the minimum value data output from the MIN value detection circuit 716 into, e.g., 32 sections (corresponding to 5 bits) and outputs division value data (5 bits) representing each division section. The division value data is normalized data from which a variation in absolute level of sample data in each block and a variation in dynamic range are eliminated.

A dynamic range detector 721 subtracts the minimum value data output from the MIN value detection circuit 716 from the maximum value data output from the MAX value detection circuit 714 and outputs dynamic range value data D. An adaptive vector quantization circuit (VQ) 722 selects an applicable code book in accordance with the dynamic range value data D from the dynamic range detection circuit 721. The division value data output from the division value converting circuit 720 are simultaneously vector-quantized in units of, e.g. 16 samples in a 16-dimensional space in accordance with the selected code book. Therefore, if the number of codes in each code book is given as, $2^8$, 80-bit (=16 samples×5 bits) information can be expressed by an 8-bit code book.

Figure 34:
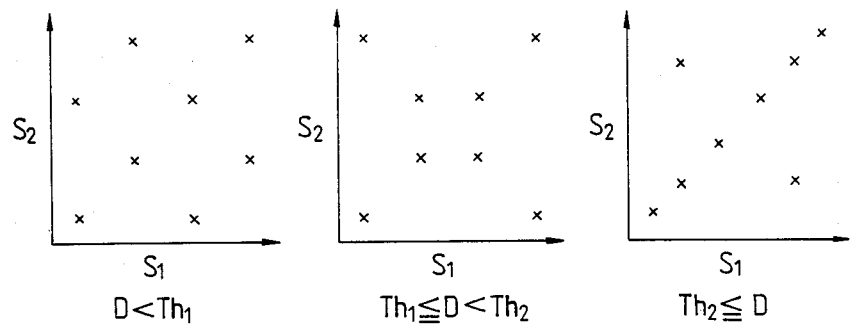
FIG. 34 is a view showing code book selection by dynamic range value data D in two-dimensional quantization.

2-dimensional vector quantization is exemplified as selection of a code book by the dynamic range value data D. In this case, an adaptive code book is set for an input signal having normalized data having low correlation in a block having a small dynamic range value D. Referring to FIG. 34, two-dimensional input vectors are represented by S1 and S2; threshold values for code book selection are represented by Th1 and Th2 (Th1<Th2); and a 3-bit representative output vector position is represented by a mark "x". When the dynamic range value data D is increased, a code book suitable for an input having higher correlation is selected. A method of selecting the code book is not limited to this scheme. A representative vector and threshold values can be arbitrarily determined, and their numbers are not limited to ones described above.

Figure 3:
FIG. 3 is a view showing a format of a transmission data series formed by the transmission system in the image information signal transmission apparatus shown in FIG. 1.

Parallel/serial (P/S) conversion circuits 724, 726, and 728 convert parallel data into serial data. A switch 730 is switched in an order of its contacts a, b, and c to supply the maximum value data MAX (8 bits), the minimum value data MIN (8 bits), and the vector-quantized (VQ) code data (8 bits) to a synchronization adding circuit 732 in an order named. The synchronization adding circuit 732 adds a sync code SYNC to the start of a series of codes, as shown in FIG. 3. Transmission data output from the synchronization adding circuit 732 is output onto a transmission line or an external storage device from an output terminal 733. A timing control circuit 734 controls all operation timings of the above circuits As described above, according to this embodiment the one-block data volume of 128 (=16 samples×8 bits) bits can be compressed into 24 (=8 bits×3) bits, and its compression ratio is 3/16.

Figure 35:
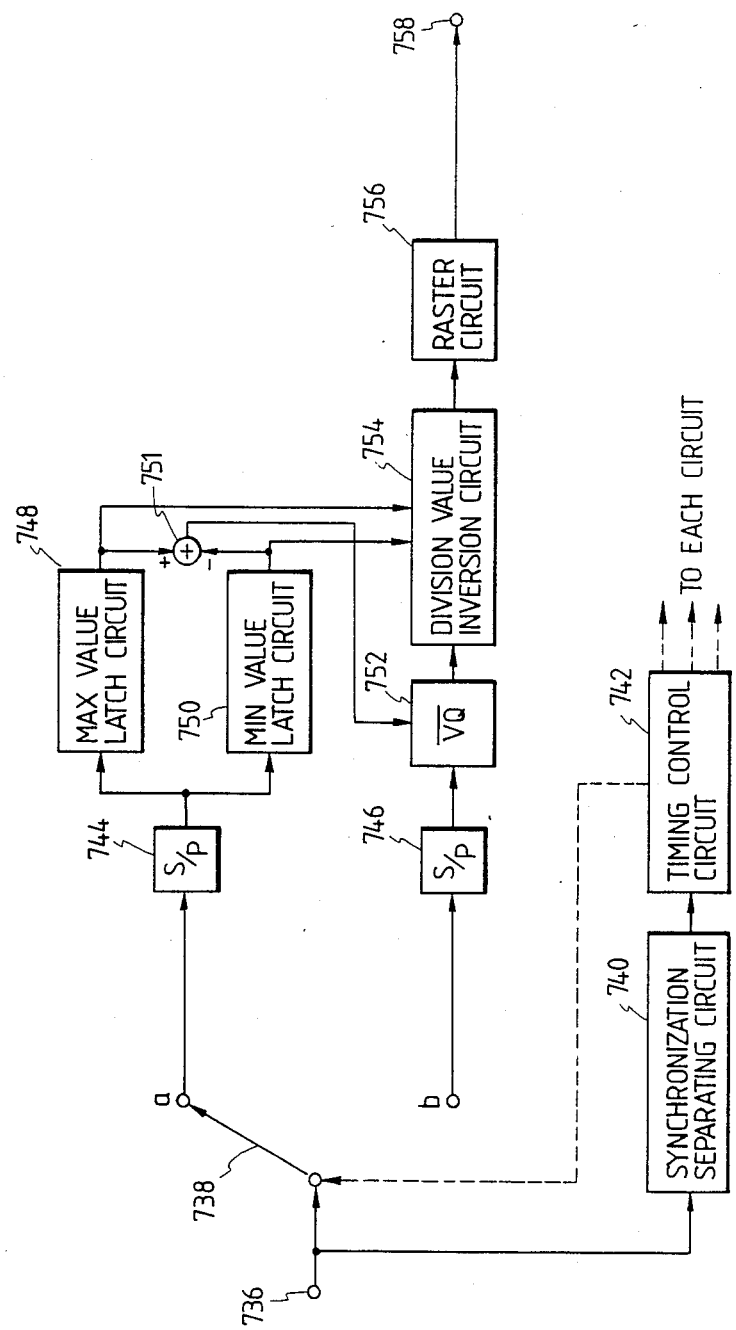
FIG. 35 is a block diagram showing an arrangement of a reception system corresponding to the transmission system in the image information signal transmission apparatus shown in FIG. 34.

FIG. 35 is a block diagram showing an arrangement of a reception system corresponding to the transmission system (FIG. 33) in the image information signal transmission system. The transmission data shown in FIG. 3 is input to an input terminal 736 in units of blocks. The transmission data input to the input terminal 736 is supplied to a switch 738 and a synchronization separating circuit 740. The synchronization separating circuit 740 separates the sync code SYNC from the transmission data and supplies this sync code to a timing control circuit 742. The timing control circuit 742 controls switching of the switch 738 and operation timings of the respective circuits on the basis of the sync code. Upon operation of the switch 732, the maximum and minimum value data MAX and MIN are supplied from the contact a to a serial/parallel (S/P) conversion circuit 744. The vector-quantized (VQ) code is supplied from the contact b to an S/P conversion circuit 746. Of all outputs from the S/P conversion circuit 744, the maximum value data MAX is latched by a MAX value latch circuit 748, and the minimum value data MIN is latched by a MIN value latch circuit 750. The maximum and minimum data are kept latched by the latch circuits 748 and 750 until the next maximum and minimum data are input.

A dynamic range detection circuit 751 subtracts the minimum value data latched by the MIN latch circuit 750 from the maximum value data latched by the MAX value latch circuit 748 and outputs dynamic range data D. An inverse vector quantization circuit 752 decides the applied code book in accordance with the dynamic range value data D and inverse vector quantization of the output (vector-quantized data) from the S/P conversion circuit 746 is performed. That is, the inverse vector quantization circuit 752 outputs division value data of 16 samples×5 bits.

A division value inversion circuit 754 refers to the maximum and minimum value data latched by the MAX and MIN value latch circuits 748 and 750, converts the division value data output from the inverse vector quantization circuit 752 into representative value data 8 bits) of the each division section, and outputs the representative value data. A raster circuit 756 converts output data from the division value inversion circuit 754 into a raster signal. The raster signal is output to an output terminal 758

In the above embodiment, as preprocessing of vector quantization, the difference between the maximum and minimum value data is divided into 32 sections in units of blocks. The present invention is not limited to this.

For example, the difference between the maximum and minimum value data may be divided into 16 sections (corresponding to 4 bits), each sample value may be normalized into 4-bit data, and the 4-bit data may be vector-quantized. A preprocessing block may have a size different from that of vector quantization block. For example, in order to obtain a compression ratio of ½, the preprocessing block consists of 32 samples (data volume: 256 (32×8) bits), and each block is normalized into a total of 144 bits, i.e., 8-bit maximum value data, 8-bit minimum value data, and the respective 4-bit data. Every two 4-bit sample data may be quantized by adaptive two-dimensional quantization. In this case, it is confirmed that the sample data is compressed into 7 bits per 2 samples to minimize degradation of image quality.

In this embodiment, after normalization is performed by utilizing local correlation of the image information signal, vector quantization is performed. Therefore, the image information signal can be transmitted in a small information volume without causing degradation of image quality. At the same time, vector quantization is performed by a vector quantization code book corresponding to a dynamic range of the image information signal. Therefore, adaptive vector quantization can be performed, and the image information signal can be transmitted with high efficiency.

A seventh embodiment of the present invention will be described with reference to the accompanying drawings. This embodiment exemplifies an image information signal transmission apparatus in which no degradation of image quality by vector quantization does not occur even if correlation between quantized data of the image information signal is low.

Figure 36:
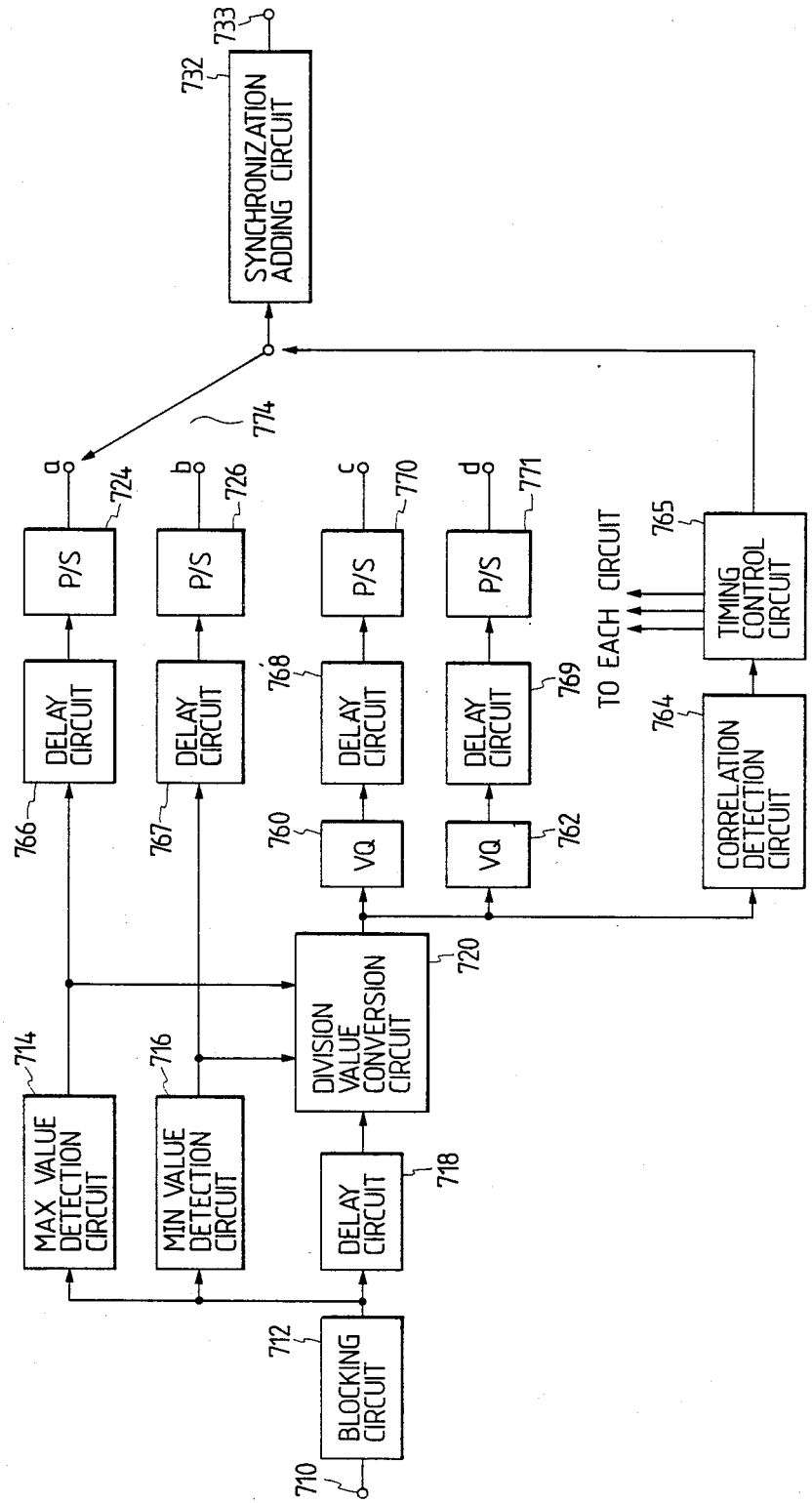
FIG. 36 is a block diagram showing an arrangement of a transmission system in an image information signal transmission apparatus according to a seventh embodiment of the present invention.

FIG. 36 is a block diagram showing an arrangement of a transmission system in an image information signal transmission apparatus according to the seventh embodiment of the present invention. The same reference numerals as in FIG. 33 denote the same parts in FIG. 36, and a detailed description thereof will be omitted. Vector quantization circuits 760 and 762 have the same arrangement as that of the vector quantization circuit 722 in FIG. 33, but perform vector quantization for correlation of data in different directions (e.g., horizontal and vertical directions). A correction detection circuit 764 receives an MSB (Most Significant Bit) of the normalized data output from a division value converting circuit 720. The correction detection circuit 764 detects whether the input value is larger than an intermediate value, depending on the MSB of logic "0" or "1". For examples, if 0s or 1s continue in the vertical direction, the correction detection circuit 764 detects that correlation is high in the vertical direction. If 0s or 1s continue in the horizontal direction, the correction detection circuit 764 detects that correlation is high in the horizontal direction. When the correlation is detected by using the intermediate value of the sample data, hardware can be advantageously minimized. A detection result from the correction detection circuit 764 is supplied to a timing control circuit 765. The timing control circuit 765 controls operation timings of the respective circuits (to be described later).

Delay circuits 766, 767, 768, and 769 adjust the operation timings. P/S conversion circuits 724, 726, 770, and 771 are respectively connected to the outputs of the delay circuits 766, 767, 768, and 769 to convert the parallel data output from these delay circuits into corresponding serial data. A switch 774 is connected to contacts a, b, c, and d under the control of the timing control circuit 765. When the detection result from the correlation detection circuit 764 designates the vector quantization circuit 760, the switch 774 is sequentially connected to the contacts a, b, and c in the order named, thereby outputting a data string shown in FIG. 37A. When the detection result from the correction detection circuit 764 designates the vector quantization circuit 762, the switch 774 is sequentially connected to the contacts b, a, and d in the order named, thereby outputting a data string shown in FIG. 37B.

A synchronization adding circuit 732 adds a sync code SYNC, as previously described. A transmission data string output from an output terminal 733 is shown in FIG. 37C or 37D.

According to the present invention, the characteristics of vector quantization are adaptively selected in accordance with the correlation of the image information signal, and therefore optimum transmission data can be formed. Information for selecting the vector quantization circuit is specified in accordance with a transmission order of maximum and minimum values. Therefore, special identification data need not be added to the transmission information, and the transmission data volume is not increased.

Figure 38:
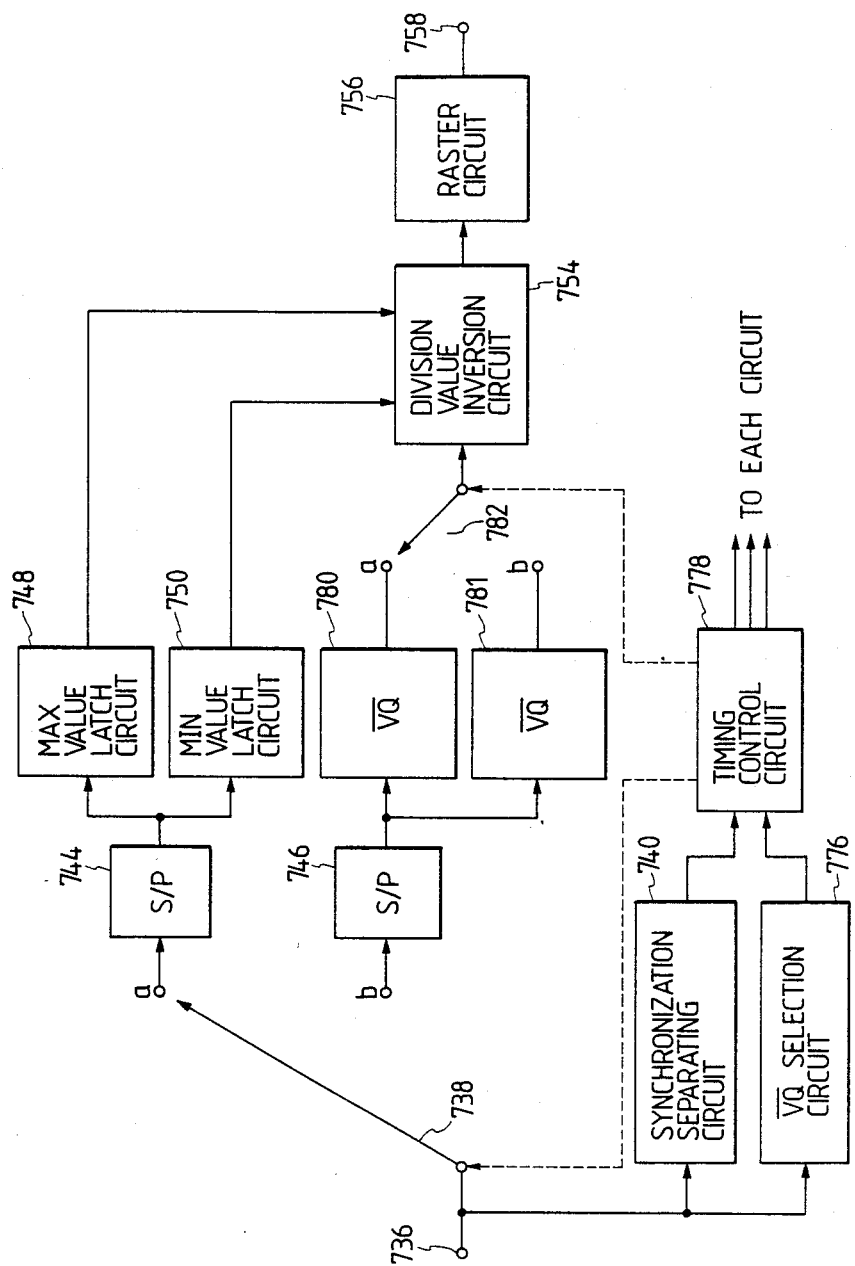
FIG. 38 is a block diagram showing a reception system corresponding to the transmission system in the image information signal transmission apparatus shown in FIG. 36.

FIG. 38 is a block diagram showing an arrangement of a reception system corresponding to the transmission system (FIG. 36) in the image information signal transmission apparatus. The same reference numerals as in FIG. 35 denote the same parts in FIG. 38, and a detailed description thereof will be omitted. The transmission data string input to an input terminal 736 in FIG. 38 is supplied to an inverse vector quantization (VQ) selection circuit 776 in addition to a switch 738 and a synchronization separating circuit 740. The selection circuit 776 detects one of the vector quantization circuits 760 and 762 which is used during transmission in accordance with the transmission order of the maximum and minimum value data MAX and MIN. A detection signal from the selection circuit 776 is supplied to a timing control circuit 778. The timing control circuit 778 also receives the sync code SYNC separated by a synchronization separating circuit 740 and controls operation timings of the respective circuits shown in FIG. 38.

As previously described, upon operation of a switch 738, the maximum value data MAX is latched by a MAX value latch circuit 748, and the minimum value data MIN is latched by a MIN value latch circuit 750. An output from an S/P conversion circuit 746 is supplied to inverse vector quantization circuits 780 and 781. The inverse vector quantization circuit 780 performs inverse vector quantization corresponding to the vector quantization circuit 760 shown in FIG. 36. The inverse vector quantization circuit 781 performs inverse vector quantization corresponding to the vector quantization circuit 762 shown in FIG. 36. Therefore, by selecting the inverse vector quantization circuit 780 or 781 corresponding to the vector quantization circuit 760 or 762 used in the transmission system of FIG. 36, optimum transmission data decoding can be performed. A switch 782 selects one of the outputs from the inverse vector quantization circuits 780 and 781 in accordance with the timing control circuit 778 (i.e., a detection result from the selection circuit 776). An output from the switch 782 is supplied to a division value inversion circuit 754.

The division value inversion circuit 754 outputs a representative value as in the case of FIG. 35, and a raster circuit 756 converts signals of each block into raster signals and outputs these raster signals.

Delay elements each having a predetermined delay time may be used in place of the latch circuits 748 and 750 in FIG. 38.

In this embodiment, after normalization is performed by utilizing local correlation of the image information signal, vector quantization is performed. Therefore, the image information signal can be transmitted in a small information volume without causing degradation of image quality. At the same time, vector quantization is performed by a vector quantization code book corresponding to correlation of the image information signal. Therefore, adaptive vector quantization can be performed, and the image information signal can be transmitted with high efficiency.

An eighth embodiment of the present invention will be described with reference to the accompanying drawings.

Figure 39:
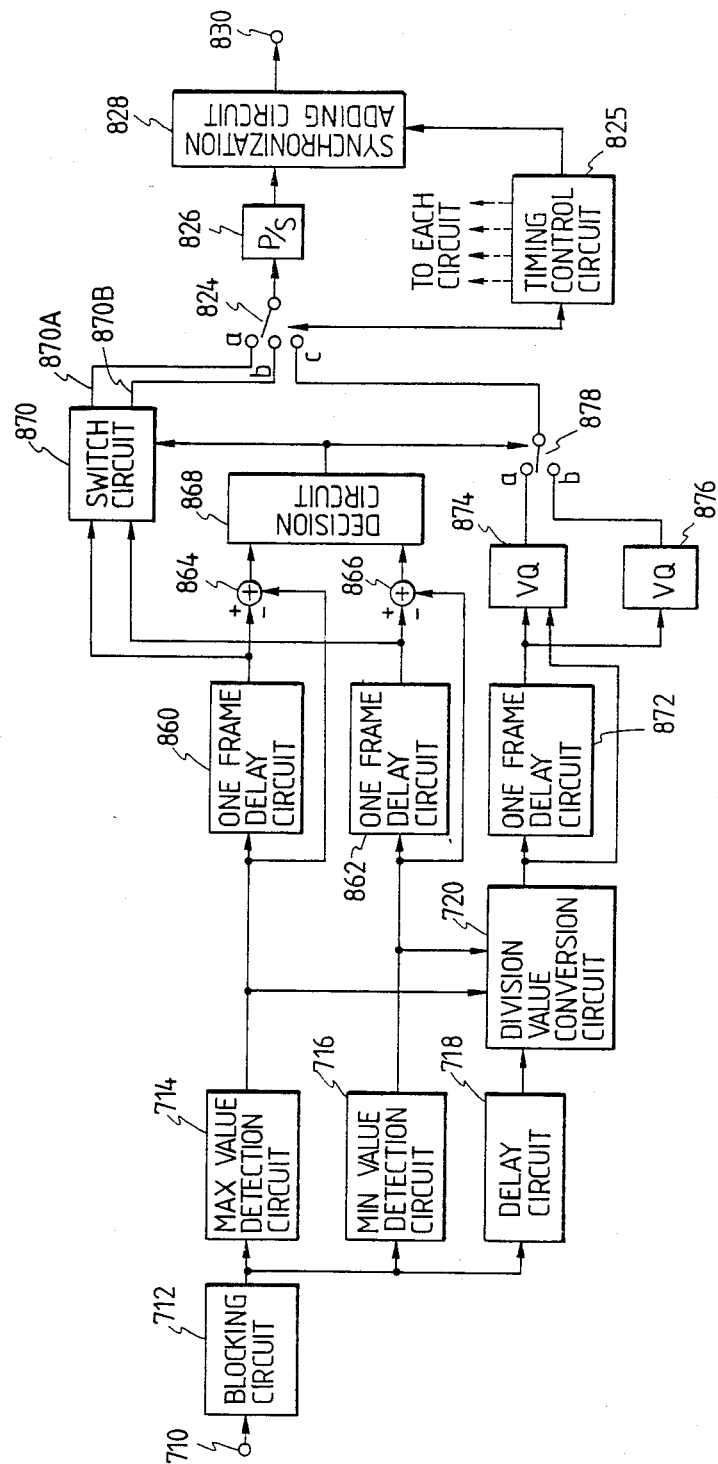
FIG. 39 is a block diagram showing an arrangement of a transmission system in an image information signal transmission apparatus according to an eighth embodiment of the present invention.

FIG. 39 is a block diagram showing an arrangement of a transmission system in an image information signal transmission apparatus according to the eighth embodiment of the present invention. The same reference numerals as in FIG. 33 denote the same parts in FIG. 39, and a detailed description thereof will be omitted.

One-frame delay circuits 860 and 862 delay outputs from a MAX value detection circuit 714 and a MIN value detection circuit 716 by a one-frame period each. A subtracter 866 subtracts the output from the MAX value detection circuit 714 from an output from the delay circuit 860. A delay circuit 866 subtracts the output from the MIN value detection circuit 716 from an output from the delay circuit 862. That is, the subtracter 864 outputs a difference ($MIN(f_{n-1}) - MIN(f_n)$) between maximum value data $MAX(f_{n-1})$ of the immediately preceding frame and maximum value data $MAX(f_n)$ of the present frame. The subtracter 866 outputs a difference ($MIN(f_{n-1}) - MIN(f_n)$) between minimum value data $MIN(f_{n-1})$ of the immediately preceding frame and minimum value data $MIN(f_n)$ of the present frame.

Figure 40:
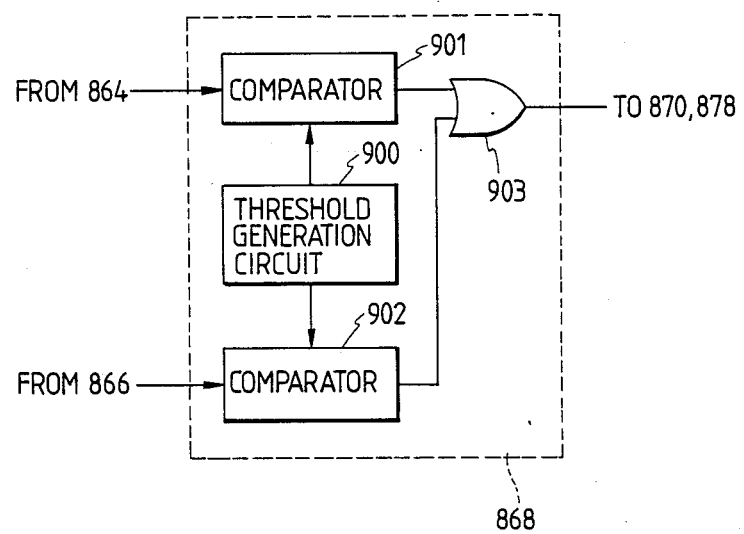
FIG. 40 is a block diagram showing an arrangement of a decision circuit in FIG. 39.

A decision circuit 868 decides from outputs from the subtracters 864 and 866 whether an image of the present block is a still image. The decision circuit 868 is arranged as shown in FIG. 40. Referring to FIG. 40, a threshold generation circuit 900 generates a motion decision threshold value. Comparators 901 and 902 compare the threshold value output from the threshold generation circuit 900 with outputs from the subtracters 864 and 866 shown in FIG. 39. When the outputs from the subtracters 864 and 866 exceed the threshold value, the comparators 901 and 902 output signals of H level. Otherwise, the comparators 901 and 902 output signals of L level. The outputs from the comparators 901 and 902 are ORed by an OR gate 903. More specifically, when one of the maximum and minimum values exceeds the predetermined threshold value, the decision circuit 868 decides that the image of the present block is a motion image. When both the maximum and minimum values are smaller than the predetermined threshold value, the decision circuit 868 decides that the image of the present block is a still image.

Referring back to FIG. 39, a switching circuit 870 directly outputs the outputs from the delay circuits 860 and 862 or reverses the outputs therefrom and outputs the reversed outputs in accordance with the output from the decision circuit 868. When the decision circuit 868 decides that the image of the present block is a motion image, the switching circuit 870 sends an output (maximum value data) from the delay circuit 860 onto an output line 870A and an output (minimum value data) from the delay circuit 862 onto an output line 807B. However, when the decision circuit 868 decides that the image of the present block is a still image, the switching circuit 870 sends the output (maximum value data) from the delay circuit 860 onto the output line 870B and the output (minimum value data) from the delay circuit 862 onto the output line 870A.

A one-frame delay circuit 872 adjusts the delay times of the delay circuits 860 and 862. A vector quantization circuit 874 for performing interframe vector quantization between the division value data output from the division value converting circuit 720 and the division value data one-frame delayed by the delay circuit 872. A vector quantization circuit 876 performs intrafield or intraframe vector quantization of the division value data output from the delay circuit 872. When the decision circuit 868 decides that the image of the present block is a still image, a switch 878 is connected to a contact a. Otherwise, the switch 878 is connected to a contact b. That is, intrafield or intraframe vector quantization is performed for a motion block, while interframe vector quantization is performed for a still block.

The output line 870A of the switching circuit 870 is connected to a contact a of a switch 824, and the output line 870B is connected to its contact b. The output of the switch 878 is connected to a contact a of the switch 824. The switch 824 is switched by a timing control circuit 825 as described in the conventional arrangement. An output signal from the switch 824 is converted into a serial signal by a P/S conversion circuit 826. A synchronization adding circuit 828 adds a transmission sync code to the data output from the conversion circuit 826.

The switching circuit 870 and the switch 878 are controlled in accordance with a decision result of the decision circuit 868. For a motion block, the transmission data string output from the output terminal 830 is arranged in an order of the maximum value data MAX, the minimum value data MIN, and the intrafield or intraframe vector-quantized data VQ, as shown in FIG. 37C. For a still block, the transmission data string is arranged in an order of the minimum value data MIN, the maximum value data MAX, and the interframe vector-quantized data VQ, as shown in FIG. 37D.

Figure 41:
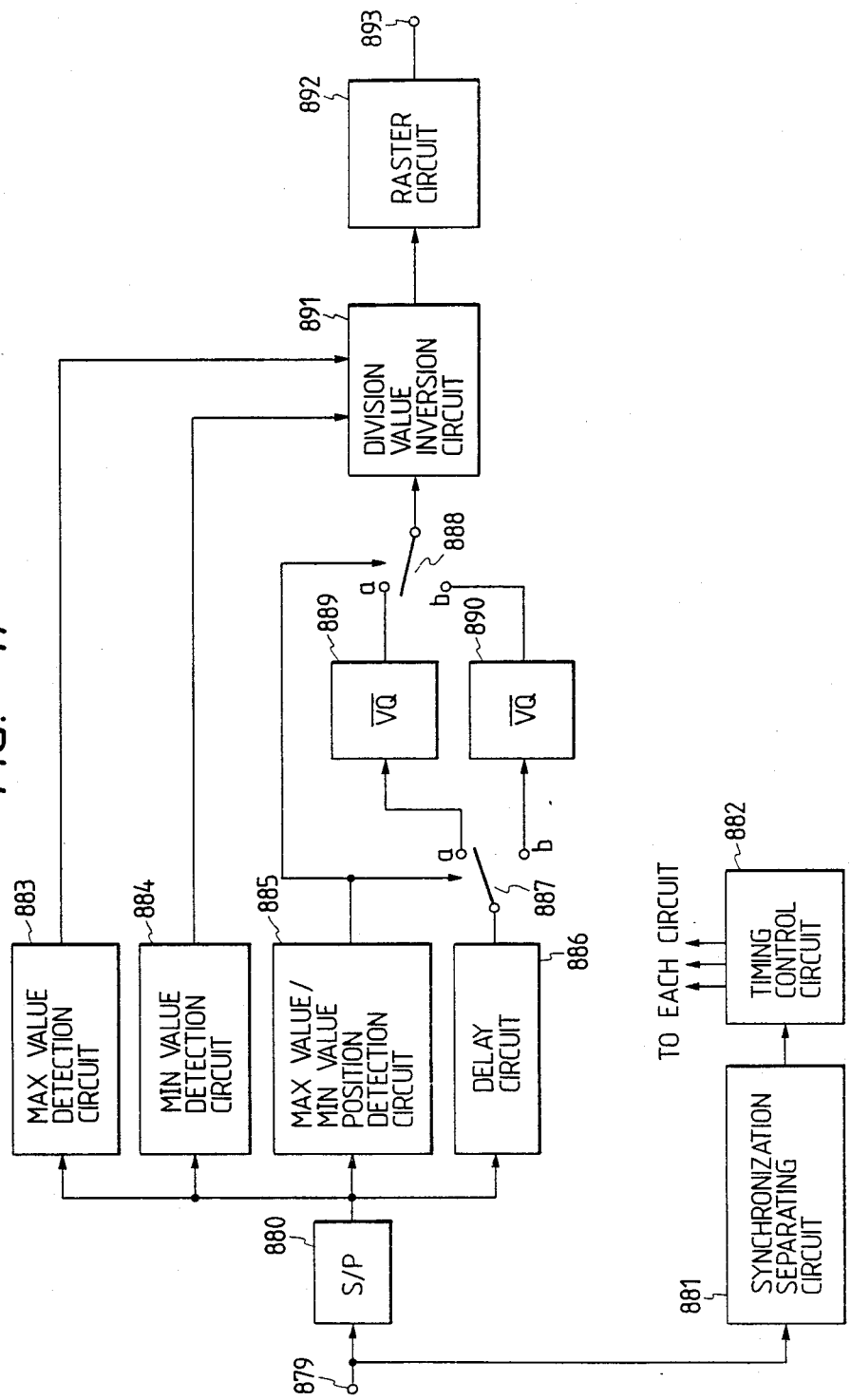
FIG. 41 is a block diagram showing an arrangement of a reception system corresponding to the transmission system in the image information signal transmission apparatus shown in FIG. 39.

FIG. 41 is a block diagram showing an arrangement of a reception system corresponding to the transmission system (FIG. 39) in the image information signal transmission apparatus.

Referring to FIG. 41, the transmission data string is input to an input terminal 879 in units of blocks. The transmission data string input to the input terminal 879 is supplied to a serial/parallel (S/P) conversion circuit 880 and a synchronization separating circuit 881. The synchronization separating circuit 881 separates the sync code SYNC from the transmission data string. The separated sync code SYNC is supplied to a timing control circuit 882. The timing control circuit 882 controls operation timings of the respective circuits shown in FIG. 41. A MAX value detection circuit 883 receives the output from the S/P conversion circuit 880 and detects maximum value data MAX, and a MIN value detection circuit 884 also receives the output from the S/P conversion circuit 880 and detects minimum value data MIN. A MAX value/MIN value position detection circuit 885 detects a transmission order of the maximum and minimum value data MAX and MIN and decides whether an image of the present block is a motion or still image. A delay circuit 886 delays the vector-quantized data VQ by a longest time of the times required by the MAX value detection circuit 883, the MIN value detection circuit 884, and the MAX value/MIN value position detection circuit 885. Switches 887 and 888 are connected to contacts a when the MAX value/MIN value position detection circuit 885 detects a still image mode. When the detection circuit 885 detects a still image mode, the switches 887 and 888 are connected to contacts b. An inverse vector quantization circuit 889 performs interframe inverse vector quantization, while an inverse vector quantization circuit 890 performs intrafield or intraframe inverse vector quantization. Upon operations of the switches 887 and 888, the inverse vector quantization circuit corresponding to the vector quantization circuit used in vector quantization during transmission is selected. An output from the switch 888 is supplied to a division value inversion circuit 891. The division value inversion circuit 891 refers to the maximum and minimum value data from the MAX and MIN value detection circuits 883 and 884 in units of blocks, converts the division value data output from the switch 888 into a representative value, and outputs the representative value to a raster circuit 892. The raster circuit 892 converts signals of each block into raster signals. The raster signals appear at an output terminal 893.

As described above, the characteristics of vector quantization can be adaptively selected in accordance with motion of the image, and therefore, optimum transmission data can be formed. That is, interframe vector quantization is performed for a still image, and the image information signal can be transmitted with high image quality. Selected information for vector quantization is decided by the transmission order of the maximum and minimum value data. Therefore, no special discrimination data need not be added to the transmission data string, and the transmission information volume is not increased.

In this embodiment, after normalization is performed by utilizing local correlation of the image information signal, vector quantization is performed. Therefore, the image information signal can be transmitted in a small information volume without causing degradation of image quality. At the same time, vector quantization is performed by a vector quantization code book corresponding to image motion of the image information signal. Therefore, adaptive vector quantization can be performed, and the image information signal can be transmitted with high efficiency.

What is claimed is:
1. An image information signal transmission apparatus comprising:
   (A) blocking means for receiving an image information signal in which one frame is constituted by a plurality of sample data and for dividing the input image information signal into a plurality of blocks each consisting of a predetermined number of sample data;
   (B) reference value data forming means for forming at least two types of reference value data associated with a dynamic range of sample data of each block in units of blocks formed by said blocking means;
   (C) first coding means for coding the sample data of each block by using the reference value data formed by said reference value data forming means and forming a plurality of first coded data in units of blocks;
   (D) second coding means for vector-quantizing the plurality of first coded data formed by said first coding means in units of blocks and forming second coded data in units of blocks; and
   (E) transmission data forming means for forming transmission data by using as a transmission unit the reference data formed by said reference value data forming means in units of blocks and the second coded data formed by said second coding means in units of blocks.

2. An apparatus according to claim 1, wherein said reference value data forming means includes:
   (A) maximum value data generating means for detecting sample data representing a maximum value in each of the plurality of blocks formed by said blocking means and generating maximum value data; and
   (B) minimum value data generating means for detecting sample data representing a minimum value in each of the plurality of blocks formed by said blocking means and generating minimum value data.

3. An apparatus according to claim 2, wherein said first coding means is arranged
   to calculate dynamic range data of the sample data in each block by subtracting the minimum value data generated by said minimum value data generating means from the maximum value data generated by said maximum value data generating means;
   to calculate quantization step width data representing a quantization step width by dividing the dynamic range data by $2^n$ (n is a positive integer);
   to divide the dynamic range represented by the dynamic range data by a value substantially half the quantization step width data to obtain $(2n+1)$ (n is a positive integer) sections; and
   to convert each sample data in each block into the first coded data representing a correspondence between one of the $(2n+1)$ sections and each sample data, and to output the first coded data.

4. An image information signal transmission apparatus comprising:
   (A) blocking means for receiving an image information signal in which one frame is constituted by a plurality of sample data and for dividing the input image information signal into a plurality of blocks each consisting of a predetermined number of sample data;
   (B) reference value data forming means for forming at least two types of reference value data associated with a dynamic range of sample data of each block in units of blocks formed by said blocking means;
   (C) first coding means for coding the sample data of each block by using the reference value data formed by said reference value data forming means and forming a plurality of first coded data in units of blocks;
   (D) second coding means for vector-quantizing the plurality of first coded data formed by said first coding means in units of blocks and forming second coded data in units of blocks;
   (E) control means for controlling a second coded data forming operation of said second coding means in accordance with a state of each block formed by said blocking means; and
   (F) transmission data forming means for forming transmission data by using as a transmission unit the reference data formed by said reference value data forming means in units of blocks and the second coded data formed by said second coding means in units of blocks.

5. An apparatus according to claim 4, wherein said second coding means includes plural types of vector quantization circuits for performing vector quantization in different combinations of the plurality of first coded data formed by said first coding means in units of blocks and for forming plural types of vector-quantized data in units of blocks.

6. An apparatus according to claim 5, wherein said control means includes:
(A) correlation detecting means for detecting a two-dimensional correlation tendency of the sample data in each block of any frame and generating correlation tendency data;
(B) deciding means for deciding by using the correlation tendency data generated by said correlation detecting means whether the two-dimensional correlation tendency of the sample data in each block is changed between adjacent frames; and
(C) selecting means for selecting one of said plural types of vector quantization circuits in accordance with the correlation tendency data generated by said correlation detecting means.

7. An apparatus according to claim 6, wherein said transmission data forming means is arranged to form the transmission data by using as a transmission unit the reference value data, the second coded data, and the correlation tendency data when said deciding means decides that the two-dimensional correlation tendency data of the sample data in each block is changed between said adjacent frames, and to form the transmission data by using as a transmission unit the reference value data and the second coded data when said deciding means decides that the two-dimensional correlation tendency of the sample data in each block is not changed.

8. An apparatus according to claim 5, wherein said control means includes:
(A) correlation detecting means for detecting a correlation tendency between the sample data in each block; and
(B) selecting means for selecting one of said plural types of vector quantization circuits in accordance with the sample data correlation tendency of each block which is detected by said correlation detecting means.

9. An apparatus according to claim 8, wherein said transmission data forming means is arranged to change a transmission order of the reference value data constituting the transmission data in accordance with the sample data correlation tendency of each block which is detected by said correlation detecting means.

10. An apparatus according to claim 8, wherein said correlation detecting means is arranged to generate correlation tendency data corresponding to the correlation tendency of the sample data in each block, and said transmission data forming means is arranged to form the transmission data by using as a transmission unit the reference value data, the second coded data, and the correlation tendency data.

11. An apparatus according to claim 4, wherein said second coding means includes plural types of vector quantization circuits having different vector quantization characteristics.

12. An apparatus according to claim 11, wherein said control means includes:
(A) dynamic range detecting means for detecting the dynamic range of the sample data in each block; and
(B) selecting means for selecting one of said plural types of vector quantization circuits in accordance with the sample data, dynamic range of each block of which is detected by said dynamic range detecting means.

13. An apparatus according to claim 11, wherein said control means includes:
(A) correlation detecting means for detecting a correlation tendency of the sample data in each block; and
(B) selecting means for selecting one of said plural types of vector quantization circuits in accordance with the sample data correlation tendency of each block which is detected by said correlation detecting means.

14. An apparatus according to claim 13, wherein said transmission data forming means is arranged to change a transmission order of the reference value data constituting the transmission data in accordance with the sample data correlation tendency of each block which is detected by said correlation detecting means.

15. An apparatus according to claim 11, wherein said control means includes:
(A) motion detecting means for detecting whether an image represented by the sample data in each block is a motion image; and
(B) selecting means for selecting one of said plural types of vector quantization circuits in accordance with a detection result representing whether the image represented by the sample data in each block is detected as the motion image by said motion detecting means.

16. An apparatus according to claim 15, wherein said transmission data forming means is arranged to change a transmission order of the reference value data constituting the transmission data in accordance with a detection result representing whether the image represented by the sample data in each block is detected as the motion image by said motion detecting means.

* * * * *

UNITED STATES PATENT AND TRADEMARK OFFICE
CERTIFICATE OF CORRECTION

PATENT NO. : 4,903,124

DATED : February 20, 1990

INVENTOR(S) : NOBUHIRO HOSHI ET AL.

It is certified that error appears in the above-identified patent and that said Letters Patent is hereby corrected as shown below:

On the title page:

AT [21]

Appl. No., "673,244" should read --324,441--;

AT [56] REFERENCES CITED

Other Publications, "428-487," should read --482-487,--.

COLUMN 3

Line 44, "6 sample points," should read --16 sample points,--.

COLUMN 10

Line 45, "such as" should read --such as MIN,--.

COLUMN 17

Line 45, "U=V 2" should read --U=V=2--.

COLUMN 25

Line 30, "no" should be deleted.

UNITED STATES PATENT AND TRADEMARK OFFICE
CERTIFICATE OF CORRECTION

PATENT NO. : 4,903,124

DATED : February 20, 1990

INVENTOR(S) : NOBUHIRO HOSHI ET AL.    Page 2 of 2

It is certified that error appears in the above-identified patent and that said Letters Patent is hereby corrected as shown below:

COLUMN 29

Line 37, "not" should be deleted.

Signed and Sealed this

Twenty-second Day of January, 1991

Attest:

HARRY F. MANBECK, JR.

*Attesting Officer*    *Commissioner of Patents and Trademarks*